US011967818B1

(12) United States Patent
Maharjan et al.

(10) Patent No.: US 11,967,818 B1
(45) Date of Patent: Apr. 23, 2024

(54) TIERED ELECTRONIC PROTECTION SYSTEMS FOR AERIAL VEHICLES

(71) Applicant: Amazon Technologies, Inc., Seattle, WA (US)

(72) Inventors: Lizon Maharjan, Seattle, WA (US); Frederic Pierre Lacaux, Kirkland, WA (US); Dean Joseph Brestel, Shoreline, WA (US); Xiaoqi Wang, Bellevue, WA (US); Andrew Lueneburg, Seattle, WA (US); Marc Ian Feifel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/708,120

(22) Filed: Mar. 30, 2022

(51) Int. Cl.
| | |
|---|---|
| *H02H 7/085* | (2006.01) |
| *B64C 39/02* | (2023.01) |
| *B64D 27/24* | (2006.01) |
| *B64D 31/00* | (2006.01) |
| *H02H 7/08* | (2006.01) |
| *B64U 50/19* | (2023.01) |

(52) U.S. Cl.
CPC ......... *H02H 7/0811* (2013.01); *B64C 39/024* (2013.01); *B64D 27/24* (2013.01); *B64D 31/00* (2013.01); *B64U 50/19* (2023.01)

(58) Field of Classification Search
CPC ...... H02H 7/0811; H02H 7/085; B64D 31/00; B64U 50/19
See application file for complete search history.

(56) References Cited

FOREIGN PATENT DOCUMENTS

| CN | 86200631 U | * | 3/1987 | ............. H02H 7/085 |
|---|---|---|---|---|
| CN | 205846705 U | * | 12/2016 | |

* cited by examiner

*Primary Examiner* — Cortez M Cook
(74) *Attorney, Agent, or Firm* — Athorus, PLLC

(57) ABSTRACT

Described are systems and methods for monitoring, detecting, and/or protecting various systems of an aerial vehicle, such as an unmanned aerial vehicle (UAV). Embodiments of the present disclosure can provide a multi-tiered system to provide monitoring, detection, and/or initiation of protection protocols in response to detected faults in connection with the electronics associated with UAV systems, such as the motor drive and/or control systems that may drive the propulsion systems of the UAV.

20 Claims, 19 Drawing Sheets

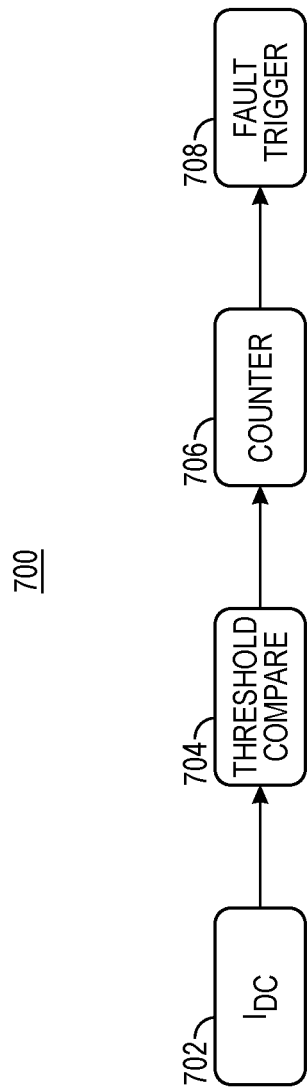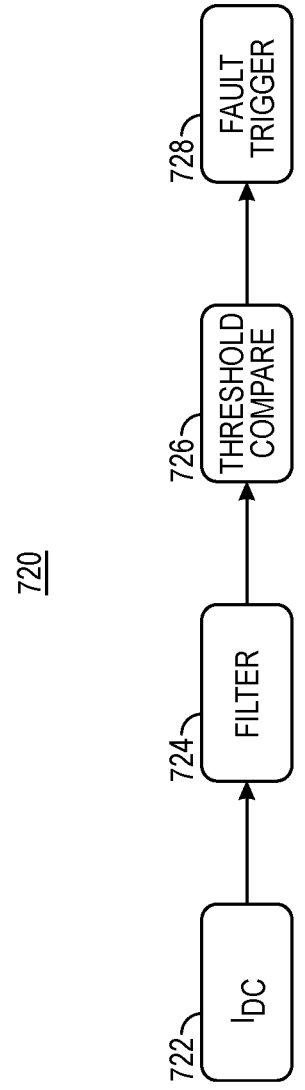

TIERED ELECTRONIC PROTECTION SYSTEMS FOR AERIAL VEHICLES

BACKGROUND

As with many electric devices and vehicles, unmanned aerial vehicles (UAVs) may experience a wide range of electrical faults and/or failures. However, unlike may electronic devices and vehicles, certain failures and/or faults experienced by UAVs during flight may result in catastrophic failure. For example, certain failures and/or faults experienced in the propulsion system of UAVs can result in loss and/or a reduction in thrust, which can lead to loss of control of the UAV and can result in a catastrophic crash of the UAV. Accordingly, comprehensive monitoring, detection, and protection of UAV systems, such as the power electronics that may drive propulsion systems for UAVs, may be desirable.

BRIEF DESCRIPTION OF THE DRAWINGS

FIGS. 7A and 7B are block diagrams of exemplary DC overcurrent protection mechanisms, according to exemplary embodiments of the present disclosure.

DETAILED DESCRIPTION

Figure 1:
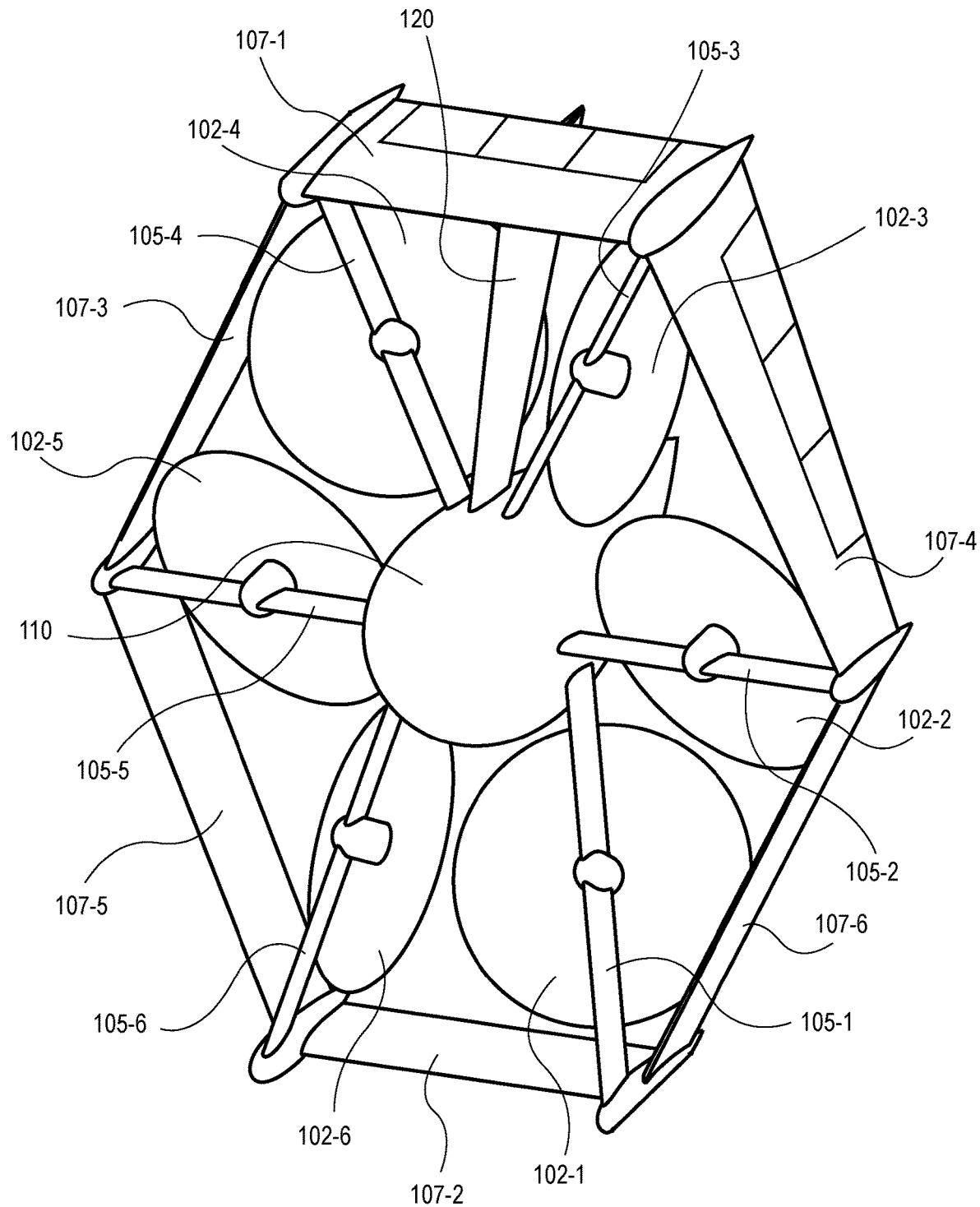
FIG. 1 illustrates an exemplary unmanned aerial vehicle, according to exemplary embodiments of the present disclosure.

As is set forth in greater detail below, embodiments of the present disclosure are generally directed to systems and methods for monitoring, detecting, and/or protecting various systems of an aerial vehicle, such as an unmanned aerial vehicle (UAV). Embodiments of the present disclosure can provide a multi-tiered system to provide monitoring, detection, and/or initiation of protection protocols in response to detected faults in connection with the electronics associated with UAV systems, such as the motor drive and/or control systems that may drive the propulsion systems of the UAV. The multi-tiered system may include protection mechanisms that are configured to detect faults (e.g., in a cascaded arrangement to provide redundancies of missed faults, etc.) in accordance with how faults are likely to encountered. For example, since many faults typically first occur in connection with the alternating current (AC) portion/components of the motor drive and/or control systems, and then propagate to the direct current (DC) portion/components of the motor drive and/or control systems, the exemplary tiered protection mechanisms may be similarly configured. According to exemplary implementations, the tiered protection mechanisms may include protection mechanisms to detect faults occurring in connection with the AC portion/components of the motor drive and/or control systems. In the event that a fault is not detected in connection with the AC portion/components of the motor drive and/or control systems, the tiered protection mechanisms may also include protection mechanisms to detect faults in the connection with the DC portion/components of the motor drive and/or control systems. Further, the tiered protection mechanisms may also include a fuse and/or breaker, which can interrupt the supply to the motor drive and/or control systems so as to isolate at least a portion of the system to prevent further damage to the system. Advantageously, the tiered protection mechanisms provided in accordance with exemplary embodiments of the present disclosure require minimal (if any) additional hardware and introduce minimal weight and/or complexity to the UAV, so as to not detrimentally affect the performance and/or operation of the UAV.

In exemplary implementations, the protection mechanisms for the AC portion/components of the motor drive and/or control systems may include overcurrent protection mechanisms, a ground fault detection mechanism, and a current imbalance detection mechanism. Additionally, the protection mechanisms for the DC portion/components of the motor drive and/or control systems may include a DC open detection mechanism and a DC overcurrent protection mechanism. Exemplary implementations of the present disclosure can also provide a fuse, breaker, or other overcurrent protection mechanisms, which can interrupt the supply to the motor drive and/or control systems so as to isolate at least a portion of the system to prevent further damage to the system. According to exemplary embodiments, the exemplary protection mechanisms may be implemented in both hardware and/or software and to provide comprehensive and redundant coverage of various failures and/or faults that may arise during operation of the UAV.

FIG. 1 illustrates an exemplary unmanned aerial vehicle 100, according to exemplary embodiments of the present disclosure.

As shown in FIG. 1, aerial vehicle 100 may include a ring wing that is substantially hexagonal in shape and that surrounds a plurality of propulsion mechanisms. Aerial vehicle 100 may include six propulsion mechanisms 102-1, 102-2, 102-3, 102-4, 102-5, and 102-6 spaced about fuselage 110 of aerial vehicle 100. Although aerial vehicle 100 is shown with six propulsion mechanisms 102, aerial vehicle 100 may include any number of propulsion mechanisms 102. Propulsion mechanisms 102 may include motors, propellers, or any other form of propulsion. For example, one or more of propulsion mechanisms 102 of aerial vehicle 100 may utilize fans, jets, turbojets, turbo fans, jet engines, and/or the like to maneuver the aerial vehicle. Generally described, propulsion mechanism 102, as used herein, can include any form of propulsion mechanism that is capable of generating a force sufficient to maneuver aerial vehicle 100, alone and/or in combination with other propulsion mechanisms. Furthermore, in certain implementations, propulsion mechanisms 102 may be configured such that their individual orientations may be dynamically modified (e.g., change from VTOL/hover flight to fixed-wing, wing-borne, horizontal flight orientation) or any position therebetween.

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

According to exemplary embodiments of the present disclosure, each propulsion mechanism 102 may include an AC motor (e.g., an induction motor, a synchronous motor, a three-phase induction motor, a permanent magnet synchronous motor, etc.). The AC motor of each propulsion mechanism 102 may be driven using a pulse width modulated (PWM) signal (e.g., generated by an electronic speed controller (ESC)), which can be converted by a gate driver to generate pulses to control one or more switches that provide the input power to each respective propulsion mechanism 102. According to exemplary implementations of the present disclosure, the exemplary tiered protection mechanisms may be employed on each propulsion mechanism 102 to monitor and detect faults occurring in connection with the motor control and/or drive system driving each propulsion mechanism 102, as well as initiate a corresponding protection protocol associated with the detected fault. The tiered protection mechanisms associated with the motor control and/or drive system associated with each propulsion mechanism 102 are described in further detail herein in connection with FIGS. 2-7C.

In the illustrated implementation, aerial vehicle 100 can also include ring wing 107, having a substantially hexagonal shape that extends around and forms the perimeter of aerial vehicle 100. In the illustrated example, ring wing 107 can include six segments 107-1, 107-2, 107-3, 107-4, 107-5, and 107-6 that are joined at adjacent ends to form the ring wing 107 around aerial vehicle 100. Each segment of ring wing 107 has an airfoil shape to produce lift when aerial vehicle 100 is oriented as illustrated in FIG. 1C and moving in a direction that is substantially horizontal. As illustrated, and discussed further below, the ring wing is positioned at a canted angle with respect to fuselage 110 such that lower segment 107-2 of ring wing 107 acts as a front wing as it is toward the front of the aerial vehicle when oriented as shown and moving in a horizontal direction. Upper segment 107-1 of ring wing 107, which has a longer chord length than lower segment 107-2 of ring wing 107, is positioned, in a horizontal orientation, further back relative to lower segment 107-2 and thus can act as a rear wing.

Ring wing 107 can be secured to fuselage 110 by motor arms 105. In this example, motor arms 105-1, 105-2, 105-3, 105-4, 105-5, and 105-6 are coupled to fuselage 110 at one end and are coupled to ring wing 107 at a second end, thereby securing ring wing 107 to fuselage 110. In other implementations, less than all of motor arms 105 may extend from fuselage 110 and couple to ring wing 107.

In some implementations, aerial vehicle 110 may also include one or more stabilizer fins 120 that extend from fuselage 110 to ring wing 107. Stabilizer fin 120 may also have an airfoil shape. In the illustrated example, stabilizer fin 120 extends vertically from fuselage 110 to ring wing 107. In other implementations, stabilizer fin 120 may be disposed at other positions. For example, stabilizer fin 120 may extend downward from the fuselage between motor arm 105-1 and motor arm 105-6.

As illustrated, propulsion mechanisms 102 may be oriented at different angles with respect to each other. For example, propulsion mechanisms 102-2 and 102-5 can be aligned with fuselage 110 such that the force generated by each of propulsion mechanisms 102-2 and 102-5 is in-line or in the same direction or orientation as the fuselage. In the illustrated example, aerial vehicle 100 is oriented for high-speed, fixed-wing, wing-borne, horizontal flight such that the fuselage is oriented horizontally in the direction of travel. In such an orientation, propulsion mechanisms 102-2 and 102-5 provide horizontal forces, also referred to herein as thrusting forces, and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of fuselage 110. Accordingly, when aerial vehicle 100 is oriented for horizontal flight, propulsion mechanisms 102-1, 102-3, 102-4, and 102-6 may be used to provide thrust in a non-horizontal direction to cause the aerial vehicle to pitch, yaw, roll, heave and/or sway. In other implementations, during horizontal flight, propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by propulsion mechanisms 102-2 and 102-5.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of propulsion mechanisms 102-1, 102-2, 102-3, 102-4, 102-5, and 102-6 is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about third motor arm 105-2 and oriented toward propulsion mechanism 102-3. Finally, propulsion mechanism 102-4 is oriented approximately thirty degrees in the first direction about fourth motor arm 105-4 and toward propulsion mechanism 102-5. As illustrated, propulsion mechanisms 102-3 and 102-6, which are on opposing sides of fuselage 110, are aligned and oriented in a same first direction (in this example, horizontal). Propulsion mechanisms 102-2 and 102-5, which are on opposing sides of fuselage 110, are aligned and oriented in a same second direction, which is angled compared to the first direction. Propulsion mechanisms 102-1 and 102-4, which are on opposing sides of fuselage 110, are aligned and oriented in a same third direction, which is angled compared to the first direction and the second direction.

Figure 2:
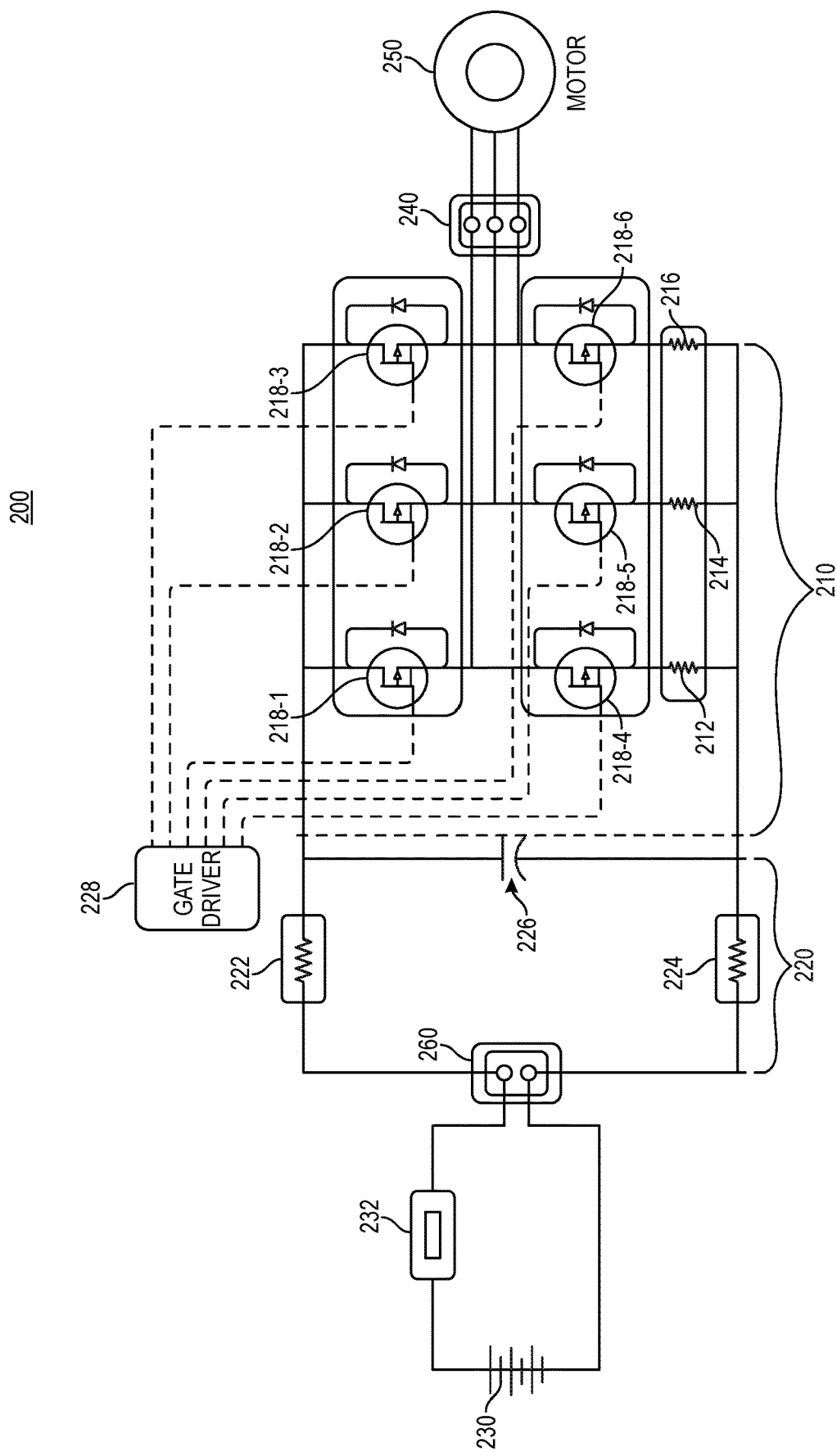
FIG. 2 illustrates a simplified exemplary motor control and/or drive system for a propulsion mechanism of a UAV, according to exemplary embodiments of the present disclosure.

FIG. 2 illustrates a simplified exemplary motor control and/or drive system 200 for a propulsion mechanism of a UAV for which a tiered protection mechanism may be implemented, according to exemplary embodiments of the present disclosure.

As shown in FIG. 2, exemplary motor control and/or drive system 200 can include AC portion/components 210, DC portion/components 220, power supply 230, AC connector 240 (e.g., to a propulsion mechanism such as motor 250), DC connector 260 and may be implemented as part of an electronic speed controller (ESC) configured to drive and control a propulsion mechanism, such as a motor, of a UAV. AC portion/components 210 can include a power stage, which includes a three-phase inverter made up of switches 218. Switches 218-1, 218-2, and 218-3 may form the high-side of the three-phase inverter and switches 218-4, 218-5, and 218-6 may form the low-side of the three-phase inverter. In operation, a control signal (e.g., a PWM signal) may be fed to gate driver 228, which may convert the control signal to gate pulses to drive switches 218, which can drive and power motor 250. Further, motor control and/or drive system 200 may be implemented with a tiered protection mechanism, which may include one or more protection mechanisms configured to detect faults and/or initiate a protection protocol in connection with the detected fault in connection with AC portion/components 210, DC portion/components 220, and/or power supply 230. As illustrated in FIG. 2, the tiered protection mechanism may monitor the voltages and currents at various points (e.g., at shunt resistors 212, 214, 216, 222, and 224 and DC capacitor 226) throughout motor control and/or drive system 200 to detect faults in connection with AC portion/components 210 of motor control and/or drive system 200 and/or DC portion/components 220. Further, the tiered protection mechanisms may also include fuse and/or breaker 232, which can interrupt the connection from power supply 230 to motor control and/or drive system 200 so as to isolate at least a portion of the system to prevent damage to motor control and/or drive system 200.

In connection with AC portion/components 210, the tiered protection mechanism may provide fault detection coverage for overcurrent conditions, ground fault conditions, and/or current imbalance conditions. Additionally, in connection with DC portion/components 220, the tiered protection mechanism may provide detection for DC open fault conditions and/or DC overcurrent fault conditions.

According to exemplary implementations, overcurrent conditions may occur in connection with AC portion/components 210, for example, when a short circuit fault presents in connection with AC portion/components 210 (e.g., AC portion/components 210, cabling, connectors, short to ground such as the UAV chassis, shorts within the motor, etc.). Depending on the location of the short circuit, the short circuit may present as a high impedance short circuit or a low impedance short circuit. Low impedance short circuits may be caused by, for example, shorts in the power electronics, line to line shorts, line to ground shorts, and the like, while high impedance short circuits may be caused by, for example, higher impedance line to line short circuits, higher impedance line to ground short circuits, motor winding short circuits, inter-turn short circuits, and the like, and may manifest, for example, as resistively dominant and/or inductively dominant short circuits. Typically, low impedance short circuits can produce large amplitude, sharp current spikes, while high impedance short circuits can produce current spikes having relatively lower amplitudes and/or current swells but for prolonged periods of time.

Accordingly, exemplary embodiments of the present disclosure may provide protection mechanisms to detect overcurrent fault conditions associated with both high impedance short circuits and low impedance short circuits. For example, exemplary implementations of the present disclosure may provide a high-threshold overcurrent protection mechanism in connection with overcurrent fault conditions that are typically associated with low impedance short circuits and a low-threshold overcurrent protection mechanism in connection with overcurrent fault conditions that are typically associated with high impedance short circuits.

In connection with overcurrent fault conditions associated with low impedance short circuits, exemplary implementations of the present disclosure may provide a high-threshold overcurrent protection mechanism. According to exemplary implementations of the present disclosure, the high-threshold overcurrent protection mechanism may monitor the currents flowing through shunt resistors 212, 214, and 216 (e.g., through the low-side of the three-phase inverter), and in the event any of the currents exceeds a threshold value for a specified period of time, an overcurrent fault may be triggered. The overcurrent fault triggered by the high-threshold overcurrent protection mechanism may initiate a protection protocol where the control signal is immediately terminated and at least a portion of motor control and/or drive system 200 is isolated. Additionally, a warning may be broadcast to other systems and controllers of the UAV, alerting the systems and controllers of the fault condition. Preferably, the high-threshold overcurrent protection mechanism may be implemented primarily as a hardware solution. The high-threshold overcurrent protection mechanism is described in further detail herein in connection with FIGS. 3A-3D.

In connection with overcurrent fault conditions associated with high impedance short circuits, exemplary implementations of the present disclosure may provide a low-threshold overcurrent protection mechanism. According to exemplary implementations of the present disclosure, the low-threshold overcurrent protection mechanism may also monitor the currents flowing through shunt resistors 212, 214, and 216. Alternatively, the low-threshold overcurrent protection mechanism may monitor the currents at different points throughout motor control and/or drive system 200 (e.g., the phase currents provided to motor 250, current flowing through the high-side of the three-phase inverter, etc.), and in the event any of the currents exceeds certain current threshold values, an accumulator may be incremented. If the incremented value of the accumulator exceeds an accumulator threshold, an overcurrent fault may be triggered. According to certain aspects of the present disclosure, the current threshold values associated with the low-threshold overcurrent protection mechanism may be lower than the threshold employed in connection with the high-threshold overcurrent protection mechanism. The overcurrent fault triggered by the low-threshold overcurrent protection mechanism may initiate a protection protocol where a warning may be broadcast to other systems and controllers of the UAV, alerting the systems and controllers of the fault condition. The low-threshold overcurrent protection mechanism is described in further detail herein in connection with FIGS. 3E-3I.

Additionally, exemplary embodiments of the present disclosure may also provide protection mechanisms to detect ground fault conditions. For example, a ground fault condition may arise when a line (e.g., lead to motor 250, connector, etc.) may short circuit to a ground of the UAV, such as the UAV's chassis, the grounded shielding of a cable, and the like. Typically, line to ground short circuits can present as both high impedance and low impedance faults depending on the design and configuration of the circuitry. Further, although ground faults could potentially be detected by overcurrent protection mechanisms, in certain ground fault conditions, the short circuit may provide an alternative path for the current to flow such that the current may bypass the points at which the current flow is monitored in connection with the overcurrent protection mechanisms (e.g., the low-side of the three-phase inverter at shunt resistors 212, 214, and 216). Accordingly, the ground fault protection mechanism may monitor currents at shunt resistors 222 and 224. Under normal operating conditions, the current flowing through shunt resistors 222 and 224 should be substantially equal. Accordingly, the monitored currents flowing through shunt resistors 222 and 224 may be summed and filtered to detect a ground fault condition. For example, when the sum of the currents flowing through shunt resistors 222 and 224 exceeds a threshold, a ground fault condition may be triggered. The triggering of the ground fault condition may cause the ground fault protection mechanism to initiate a protection protocol where the control signal is immediately terminated and at least a portion of motor control and/or drive system 200 is isolated. Additionally, a warning may be broadcast to other systems and controllers of the UAV, alerting the systems and controllers of the fault condition.

Alternatively and/or in addition, the ground fault protection mechanism may monitor the current flowing through shunt resistor 222 and the total current flowing through the low-side of the three-phase inverter (e.g., through shunt resistors 212, 214, and 216). Under normal operating conditions, the current flowing through shunt resistor 222 and the total current flowing through the low-side of the three-phase inverter (e.g., through shunt resistors 212, 214, and 216) should be substantially equal. Accordingly, the total current flowing through the low-side of the three-phase inverter (e.g., through shunt resistors 212, 214, and 216) may be compared with the current flowing through shunt resistor 222 and filtered to detect and trigger a ground fault condition. The ground fault triggered by the ground fault protection mechanism may initiate a protection protocol where the control signal is immediately terminated and at least a portion of motor control and/or drive system 200 is isolated. Additionally, a warning may be broadcast to other systems and controllers of the UAV, alerting the systems and controllers of the fault condition. The ground fault protection mechanism is described in further detail herein in connection with FIGS. 4A-4D.

Exemplary implementations of the present disclosure may also provide current imbalance protection mechanisms to detect current imbalances in connection with the three-phases of motor control and/or drive system 200. Under normal operating conditions, the three line currents are typically substantially equal. However, current imbalances may occur as a result of anomalies and/or fault conditions, such as an open circuit (e.g., in cabling, connectors, leads, switch faults, etc.). Accordingly, such open circuit conditions can result in an anomaly where the line currents are no longer equal. The current imbalance protection mechanism monitors for this fault condition by monitoring the three line currents flowing through the low-side of the three-phase inverter (e.g. through shunt resistors 212, 214, and 216). The line currents are filtered to generate a DC current value for each of the currents, and the three DC current values of the currents are compared to detect a current imbalance fault condition. For example, if the comparison of the DC current values of the currents exceeds a threshold, a current imbalance fault condition may be triggered. The ground fault triggered by the ground fault protection mechanism may initiate a protection protocol where a warning may be broadcast to other systems and controllers of the UAV, alerting the systems and controllers of the fault condition. The current imbalance protection mechanism is described in further detail herein in connection with FIG. 5.

Exemplary implementations of the present disclosure may also provide DC open circuit protection mechanisms. The DC open circuit protection mechanisms may be configured to detect failure and/or fault conditions where an open circuit type failure in connection with DC portion/components 220. Such open circuit conditions can be caused by, for example, a fuse failure, a connector failure, a cable and/or trace failure, and the like. Further, although it may be expected that DC current would immediately drop in view of the open circuit condition, under certain conditions, the DC voltage may be maintained (e.g., continued spinning of motor 250 may cause a reverse power flow that maintains DC voltage) despite the open circuit condition. To detect such failure conditions, the DC open circuit protection mechanisms may monitor a DC voltage (e.g., across DC capacitor 226) and a DC current (e.g., flowing through shunt resistor 222). The DC voltage may be compared against an upper threshold and a lower threshold and the DC current may be compared against a current threshold. The DC open circuit protection mechanism may trigger a fault condition when the DC current is below the current threshold and DC voltage is either above the upper threshold or below the lower threshold. The DC open circuit fault triggered by the DC open circuit protection mechanism may initiate a protection protocol where a warning may be broadcast to other systems and controllers of the UAV, alerting the systems and controllers of the fault condition. The DC open circuit protection mechanism is described in further detail herein in connection with FIG. 6.

Exemplary implementations of the present disclosure may also provide DC overcurrent protection mechanisms to detect DC overcurrent fault conditions. For example, an undetected overcurrent condition in connection with the AC portion/components 210 may propagate to DC portion/components 220 and cause DC current overshoots in connection with DC portion/components 220. Accordingly, the DC overcurrent protection mechanism may provide secondary coverage to detect such DC current overshoots in the event that it was not detected in connection with AC portion/components 210 (e.g., by the AC high-threshold overcurrent protection mechanism and/or the AC low-threshold overcurrent protection mechanism). Further, detection of such DC overcurrent fault conditions and initiation of protection protocols may preserve fuse 232 (e.g., before failure of fuse 232). According to exemplary implementations, the DC overcurrent protection mechanism may monitor the DC current at shunt resistor 222. The monitored current can be compared against one or more threshold values to detect and trigger DC overcurrent fault condition. For example, the DC overcurrent protection mechanism may trigger a fault condition when the DC current is above a respective threshold value for a certain count and/or a filtered DC current value exceeds a threshold value. The DC overcurrent fault triggered by the DC overcurrent protection mechanism may initiate a protection protocol where a warning may be broadcast to other systems and controllers of the UAV, alerting the systems and controllers of the fault condition. The DC overcurrent protection mechanism is described in further detail herein in connection with FIGS. 7A-7C.

Figure 3A:
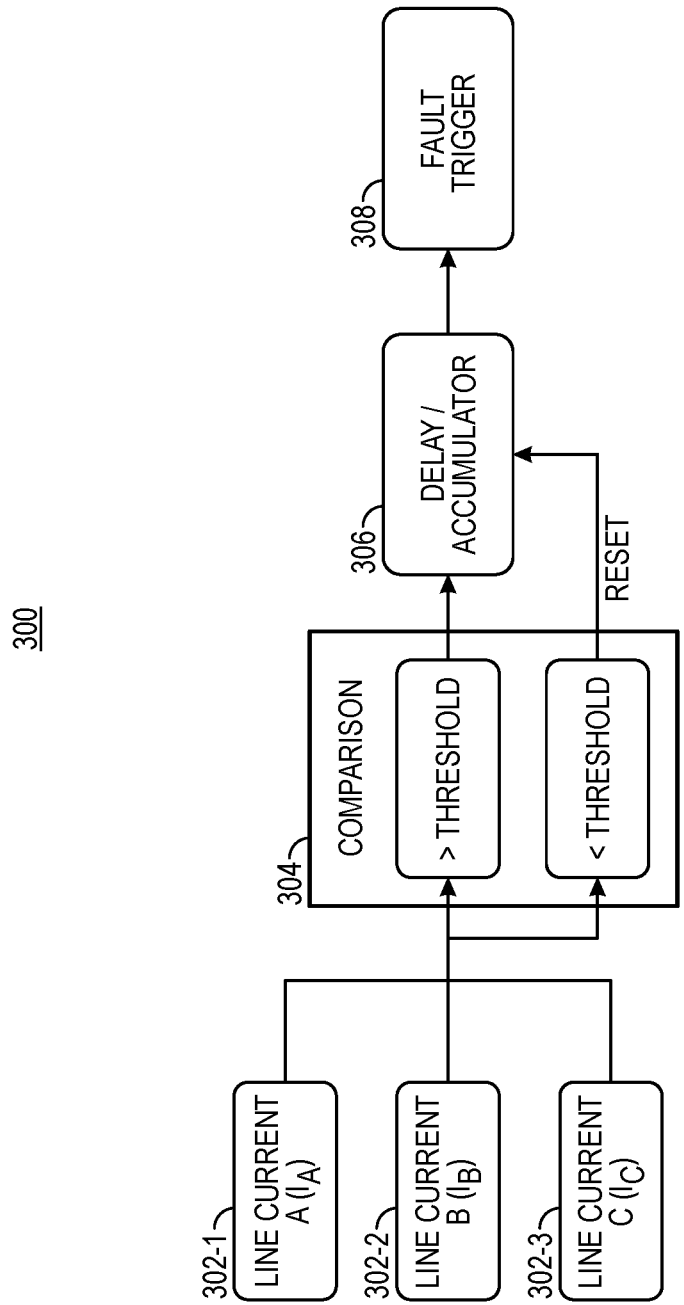
FIG. 3A is a block diagram of an exemplary high-threshold overcurrent protection mechanism, according to exemplary embodiments of the present disclosure.

FIG. 3A is a block diagram of an exemplary high-threshold overcurrent protection mechanism 300, according to exemplary embodiments of the present disclosure.

According to exemplary embodiments of the present disclosure, high-threshold overcurrent protection mechanism 300 may be implemented primarily as a hardware solution (e.g., as an integrated circuit, as a discrete circuit, etc.) to monitor and detect, for example, overcurrent fault conditions in connection with the AC portion/components of a motor control and/or drive system for a propulsion mechanism of a UAV. High-threshold overcurrent protection mechanism 300 may employ hardware circuitry that is able to detect and trigger an overcurrent fault condition on the magnitude of microseconds (e.g., 1 µs, 2 µs, 2.5 µs, 5 µs, 7.5 µs, 10 µs, 12.5 µs, 15 µs, etc.), and preferably less than 50 µs. In the event an overcurrent fault is triggered by high-threshold overcurrent protection mechanism 300, a protection protocol may be initiated where the control signal is immediately terminated, at least a portion of the motor control and/or drive system is isolated, and a warning is broadcast to other systems and controllers of the UAV, alerting the systems and controllers of the fault condition.

As shown in FIG. 3A, high-threshold overcurrent protection mechanism 300 may be configured to monitor line currents 302-1, 302-2, and 302-3. Line currents 302-1, 302-2, and 302-3 may correspond to one phase of a three-phase signal used to drive a propulsion mechanism (e.g., a motor) of a UAV. According to an exemplary implementation, line currents 302-1, 302-2, and 302-3 may be monitored on the low-side of a three-phase inverter (e.g., at shunt resistors 212, 214, and 216) of a power stage of a motor control and/or drive system configured to drive and control the propulsion mechanism (e.g., a motor) of the UAV.

Each line current 302-1, 302-2, and 302-3 may be compared (e.g., using a comparator circuit in block 304) against a threshold value (e.g., using a comparator, an operational amplifier, etc.). As illustrated in FIG. 3A, if any of line currents 302-1, 302-2, and/or 303-3 exceeds the threshold value, delay/accumulator 306 may be triggered. Once delay/accumulator 306 reaches its predetermined threshold value, overcurrent fault 308 may be triggered. The triggering of overcurrent fault 308 may cause high-threshold overcurrent protection mechanism 300 to initiate a protection protocol where the control signal is immediately terminated and at least a portion of the motor control and/or drive system is isolated. Additionally, a warning may be broadcast to other systems and controllers of the UAV, alerting the systems and controllers of the fault condition.

According to certain exemplary implementations, high-threshold overcurrent protection mechanism 300 may have a threshold value of 250 A and a hysteresis band of 200 A to 250 A. Further, delay/accumulator 306 may have a delay of 2.5 µs. However, the threshold value, the hysteresis band, and the delay may be established at any value depending on the particular application of high-threshold overcurrent protection mechanism 300. For example, the threshold value, the hysteresis band, and the delay may be determined based on parameters, such as the maximum possible current (e.g., with a margin, etc.), current ratings associated with the hardware (e.g., current ratings associated with the switches of the inverter of the power stage of the motor control and/or drive system), system behavior, worst case scenario analysis, and the like.

Additionally, high-threshold overcurrent protection mechanism 300 may include reset logic for delay/accumulator 306. For example, reset logic 304-2 may employ a hard reset technique, a decreasing integration technique, and/or an integration with time reset technique. In an exemplary implementation where a hard reset technique is employed, delay/accumulator 306 is reset when the line current (e.g., one or more of line currents 302-1, 302-2, and/or 302-3) that exceeded the threshold value drops below the threshold value. The hard reset technique is described in further detail herein in connection with FIG. 3B. In an exemplary implementation where a decreasing integration technique is employed, delay/accumulator 306 is decreased by a pre-defined value when the line current (e.g., one or more of line currents 302-1, 302-2, and/or 302-3) that exceeded the threshold value drops below the threshold value. The decreasing integration technique is described in further detail herein in connection with FIG. 3C. In an exemplary implementation where an integration with time reset technique is employed, delay/accumulator 306 is increased when a line current (e.g., one or more of line currents 302-1, 302-2, and/or 302-3) exceeds the threshold value and holds the value when the line current drops below the threshold value. The decreasing integration technique is described in further detail herein in connection with FIG. 3D.

Figure 3B:
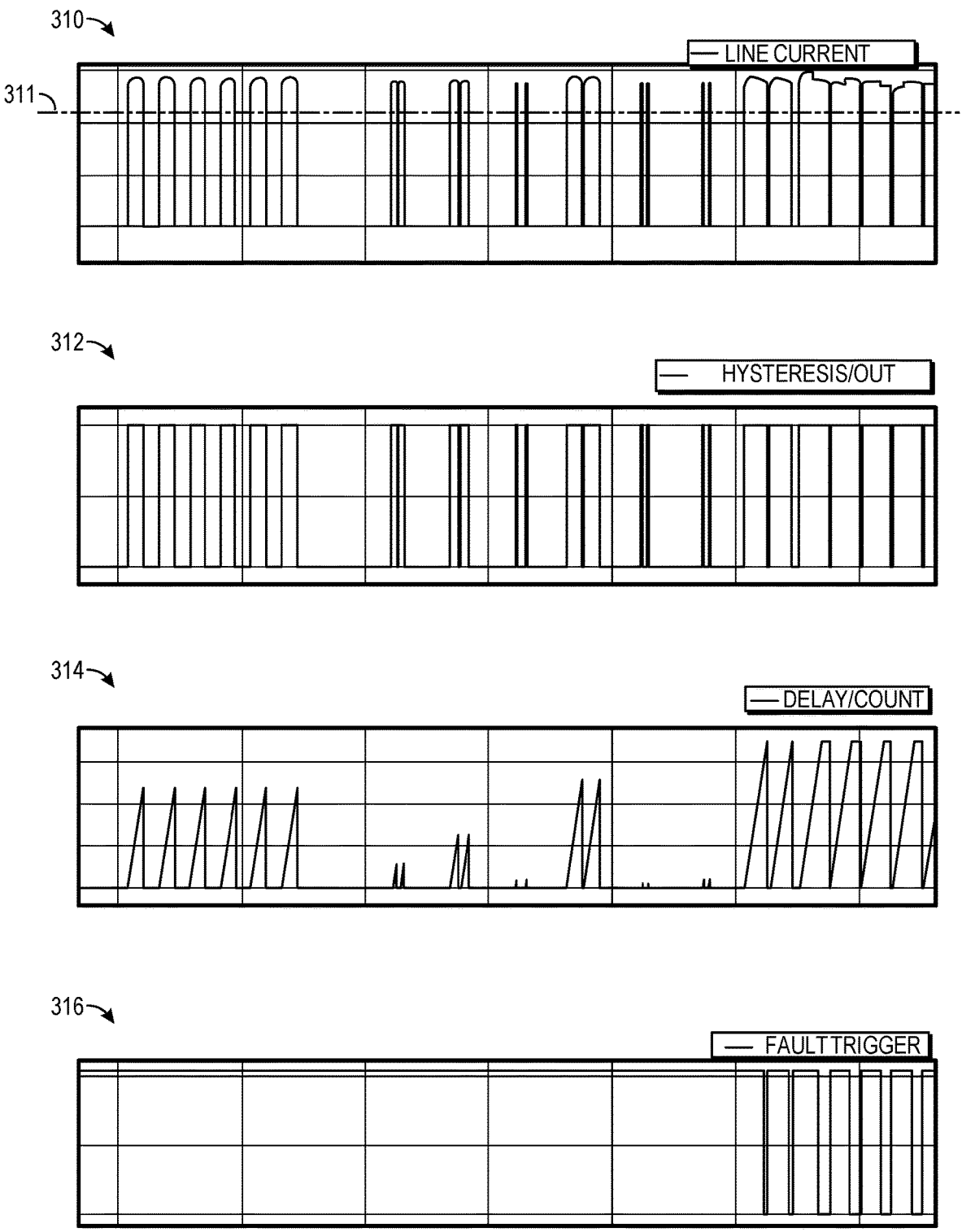
FIGS. 3B-3D are illustrations of exemplary waveforms associated with the performance of overcurrent protection mechanisms, according to exemplary embodiments of the present disclosure.
Figure 3C:
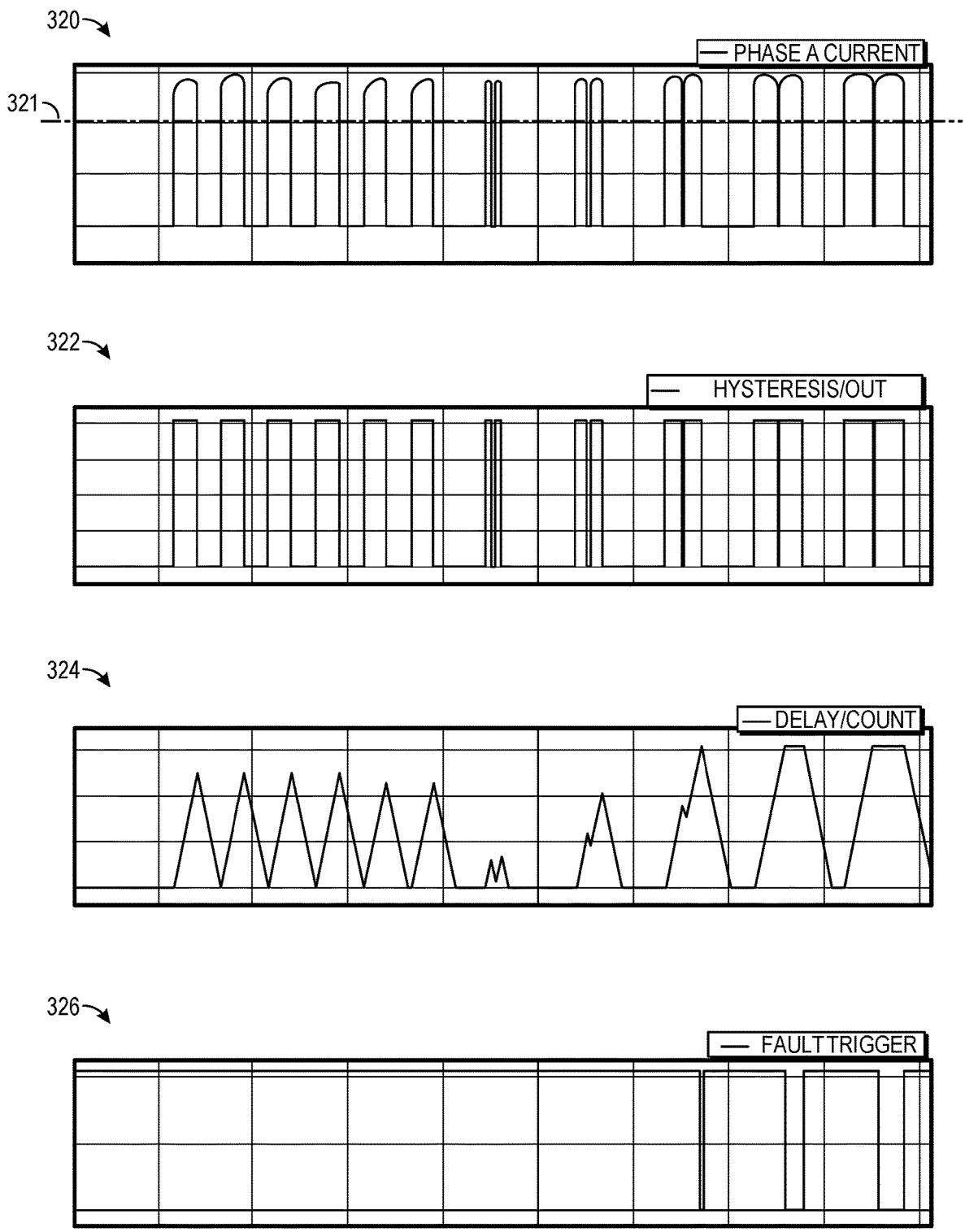
Figure 3D:
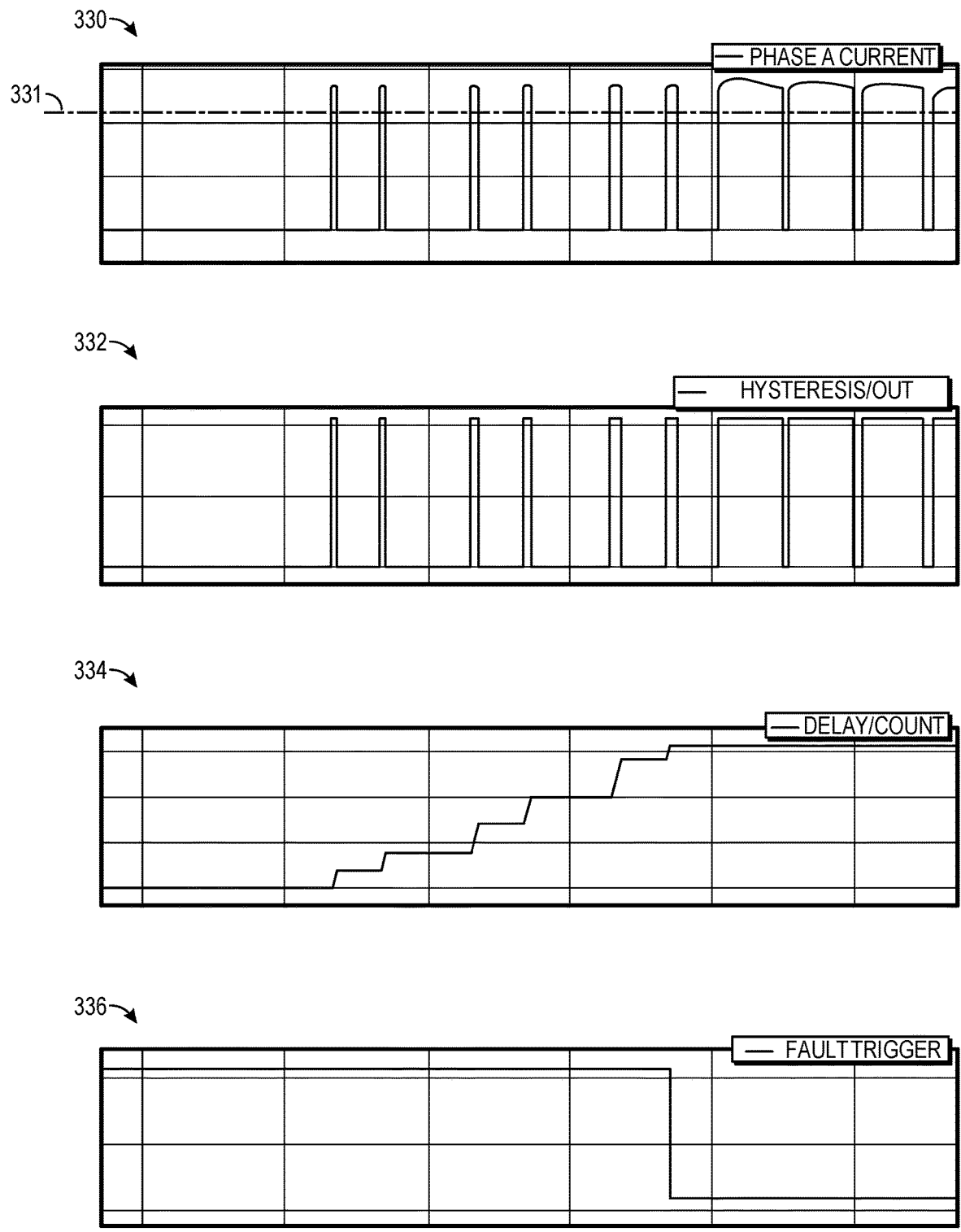

FIGS. 3B-3D are illustrations of exemplary waveforms associated with the performance of overcurrent protection mechanisms, according to exemplary embodiments of the present disclosure.

FIG. 3B illustrates exemplary waveforms 310, 312, 314, and 316 associated with the performance of an overcurrent protection mechanism, such as high-threshold overcurrent protection mechanism 300, employing a hard reset technique. Waveform 310 is an illustration of a plot of a line current (e.g., any of currents 302-1, 302-2, and/or 302-3) as a function of time. As shown in FIG. 3B, as the line current shown in waveform 310 exceeds a current threshold value (e.g., dashed line 311), as shown in waveform 312, a hysteresis output (e.g., comparison in block 304) may generate a logic HIGH. While the hysteresis output is HIGH, as shown in waveform 314, a delay or counter (delay/accumulator 306) may be incremented. However, once the line current moves to below the threshold value (and the hysteresis output switches to a logic LOW, as shown in waveform 312), the delay or counter is reset, as shown in waveform 314. The incrementing and reset of the delay or counter are illustrated by the sawtooth waveform shown in waveform 314. Further, waveform 316 illustrates an overcurrent fault condition has been triggered, with triggering of the fault condition based on the value of the delay or counter (shown in waveform 314) being shown as a logic LOW in waveform 316.

FIG. 3C illustrates exemplary waveforms 320, 322, 324, and 326 associated with the performance of an overcurrent protection mechanism, such as high-threshold overcurrent protection mechanism 300, employing a decreasing integration technique. Waveform 320 is an illustration of a plot of a line current (e.g., any of currents 302-1, 302-2, and/or 302-3) as a function of time. As shown in FIG. 3C, as the line current shown in waveform 320 exceeds a current threshold value (e.g., dashed line 321), as shown in waveform 322, a hysteresis output (e.g., comparison in block 304) may generate a logic HIGH. While the hysteresis output is HIGH, as shown in waveform 324, a delay or counter (delay/accumulator 306) may be incremented. However, once the line current moves to below the threshold value (and the hysteresis output switches to a logic LOW, as shown in waveform 322), the delay or counter is decremented, as shown in waveform 324. The incrementing and decrementing of the delay or counter are illustrated by the triangle waveform shown in waveform 324. Further, waveform 326 illustrates an overcurrent fault condition has been triggered, with triggering of the fault condition based on the value of the delay or counter (shown in waveform 324) being shown as a logic LOW in waveform 326.

FIG. 3D illustrates exemplary waveforms 330, 332, 334, and 336 associated with the performance of an overcurrent protection mechanism, such as high-threshold overcurrent protection mechanism 300, employing an integration with time reset technique. Waveform 330 is an illustration of a plot of a line current (e.g., any of currents 302-1, 302-2, and/or 302-3) as a function of time. As shown in FIG. 3D, as the line current shown in waveform 330 exceeds a current threshold value (e.g., dashed line 331), as shown in waveform 332, a hysteresis output (e.g., comparison in block 304) may generate a logic HIGH. Each time the hysteresis output is HIGH, as shown in waveform 334, a delay or counter (delay/accumulator 306) may be incremented. Further, even if the line current moves to below the threshold value (and the hysteresis output switches to a logic LOW, as shown in waveform 332), the value of the delay or counter held, as shown in waveform 334. The incrementing and holding of the delay or counter are illustrated by the stepped function waveform shown in waveform 334. Further, waveform 336 illustrates an overcurrent fault condition has been triggered, with triggering of the fault condition based on the value of the delay or counter (shown in waveform 334) being shown as a logic LOW in waveform 336.

Figure 3E:
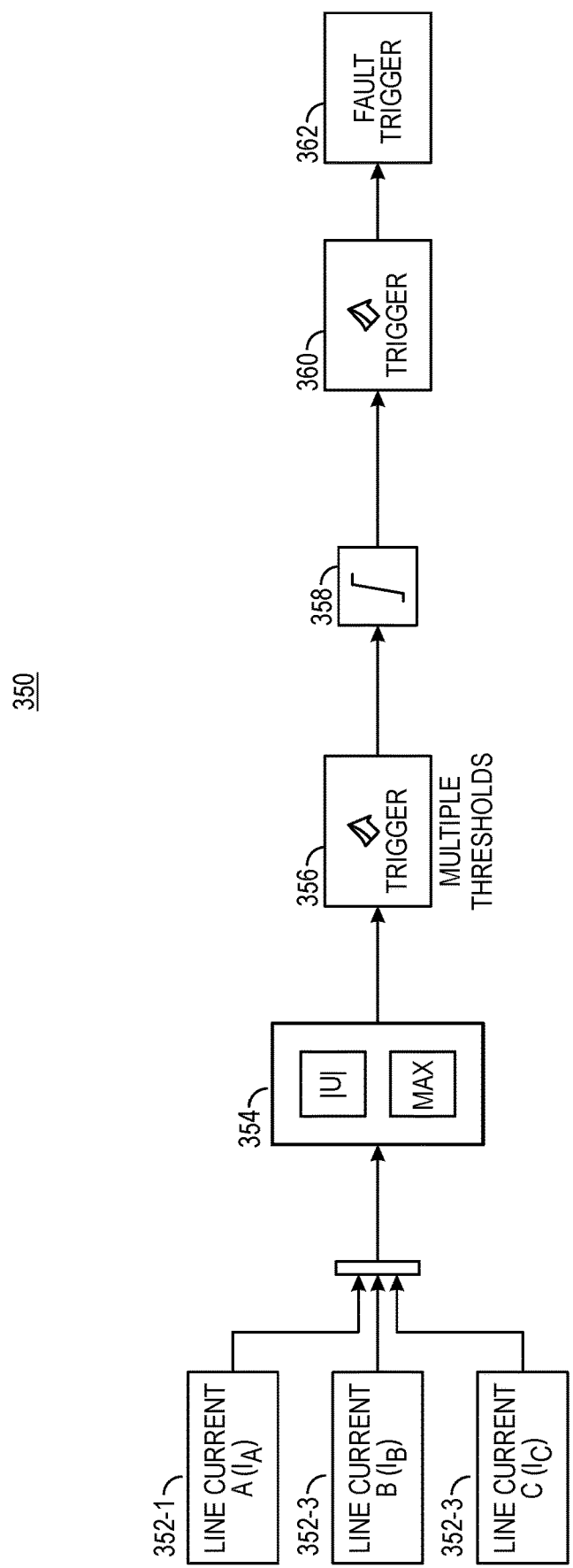
FIGS. 3E and 3F are block diagrams of exemplary low-threshold overcurrent protection mechanisms, according to exemplary embodiments of the present disclosure.
Figure 3F:
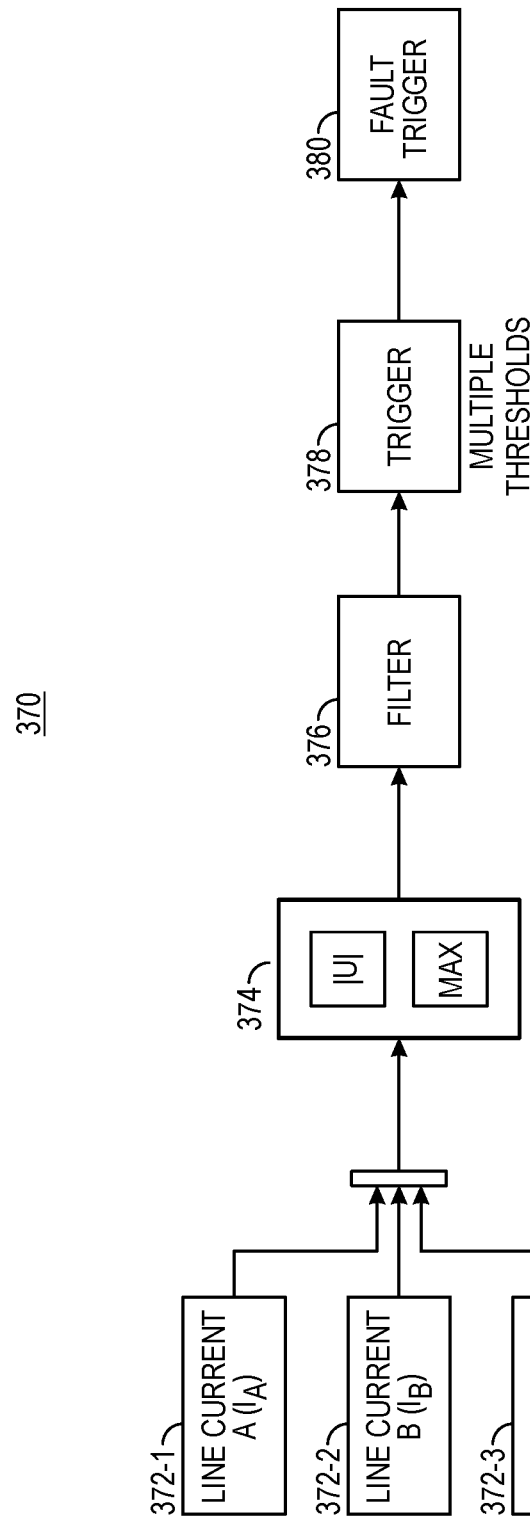

FIGS. 3E and 3F are block diagrams of exemplary low-threshold overcurrent protection mechanisms 350 and 370, according to exemplary embodiments of the present disclosure.

According to exemplary embodiments of the present disclosure, low-threshold overcurrent protection mechanisms 350 and 370 may be configured to monitor and detect, for example, overcurrent fault conditions in connection with the AC portion/components of a motor control and/or drive system for a propulsion mechanism of a UAV. According to exemplary implementations, when compared to high-threshold overcurrent protection mechanism 300, low-threshold overcurrent protection mechanisms 350 and 370 may be configured to detect overcurrent conditions having lower amplitudes that are sustained for longer periods of time. For example, low-threshold overcurrent protection mechanisms 350 and 370 may be configured to monitor and detect overcurrent fault conditions where the amplitude of an overcurrent condition is not sufficiently high to trigger high-threshold overcurrent protection mechanism 300. The overcurrent fault triggered by the low-threshold overcurrent protection mechanism may initiate a protection protocol where a warning may be broadcast to other systems and controllers of the UAV, alerting the systems and controllers of the fault condition.

As shown in FIG. 3E, low-threshold overcurrent protection mechanism 350 may be configured to monitor line currents 352-1, 352-2, and 352-3. Line currents 352-1, 352-2, and 352-3 may correspond to one phase of a three-phase signal used to drive a propulsion mechanism (e.g., a motor) of a UAV. According to an exemplary implementation, line currents 352-1, 352-2, and 352-3 may be monitored on the low-side of a three-phase inverter (e.g., at shunt resistors 212, 214, and 216) of a power stage of a motor control and/or drive system configured to drive and control the propulsion mechanism (e.g., a motor) of the UAV.

An absolute value and a maximum value of each line current 352-1, 352-2, and 352-3 may be obtained (e.g., in block 354) to obtain the peaks of each of line currents 352-1, 352-2, and 352-3. The maximum values associated with each line current 352-1, 352-2, and 352-3 may be compared against one or more current thresholds, in block 356. For example, the maximum values associated with each line current 352-1, 352-2, and 352-3 can be compared to a low current threshold, a middle current threshold, and a high current threshold. According to certain exemplary implementations, the low current threshold may be established at 160 A, the middle current threshold may be established at 190 A, and the high current threshold may be established at 220 A.

The output of the multiple current threshold comparison may be provided to accumulator 358. Depending on which of the current thresholds is exceeded by the maximum values associated with line currents 352-1, 352-2, and 352-3, accumulator 358 can be incremented by a predetermined value. For example, if the low current threshold is exceeded by one or more of the maximum values associated with line currents 352-1, 352-2, and 352-3, accumulator 358 may be incremented by a relatively low increment value. Similarly, if the middle current threshold is exceeded by one or more of the maximum values associated with line currents 352-1, 352-2, and 352-3, accumulator 358 may be incremented by a middle increment value, which is higher than the low increment value, and if the high current threshold is exceeded by one or more of the maximum values associated with line currents 352-1, 352-2, and 352-3, accumulator 358 may be incremented by a relatively high increment value, which is higher than the middle and low increment values. Once accumulator 358 reaches an accumulator threshold, trigger 360 may trigger overcurrent fault condition 362. Alternatively, the increment value may be the same for each current threshold and the accumulator threshold may be varied for each current threshold (e.g., a relatively low accumulator threshold for the high current threshold, a relatively high accumulator threshold for the low current threshold, etc.). According to exemplary implementations of the present disclosure, the increment value associated with the low current threshold may have a value of 1, the increment value associated with the middle current threshold may have a value of 100, the increment value associated with the high current threshold may have a value of 200, and the accumulator threshold may have a value of 200. Continuing the exemplary implementation, an overcurrent fault condition would be triggered in connection with the low current threshold after 200 samples, which would result in a 10 ms detection time at a sampling rate of 50 µs. Consequently, an overcurrent fault condition would be triggered in connection with the middle current threshold after 2 samples, which would result in a 100 µs detection time at a sampling rate of 50 µs, and after 1 sample in connection with the high current threshold (e.g., a detection time of 50 µs detection time at a sampling rate of 50 µs).

Additionally, the current thresholds, increment values, and/or accumulator threshold may be established at any value depending on the particular application for which low-threshold overcurrent protection mechanism 350 is being employed. For example, the AC currents experienced by the motor control and/or drive system may vary based on different loads presented by the motor. Typically, the load presented by the motor may vary as a function of the speed of the motor and/or propulsion mechanism. Accordingly, the current thresholds, increment values, and/or accumulator threshold may be varied in view of operating conditions based on the expected AC current values based on the operating conditions (e.g., speed) of the motor. For example, the current thresholds, increment values, and/or accumulator threshold may be continuously and dynamically varied during operation of the UAV to compensate for different loads presented by the motor in view of higher and/or lower speed operation.

FIG. 3F illustrates an exemplary low-threshold overcurrent protection mechanism 370, according to exemplary embodiments of the present disclosure. Low-threshold overcurrent protection mechanism 370 illustrated in FIG. 3F may be substantially similar to low-threshold overcurrent protection mechanism 350 shown in FIG. 3E, however, low-threshold overcurrent protection mechanism 370 may include a filter-based design rather than an accumulator.

As shown in FIG. 3F, low-threshold overcurrent protection mechanism 370 may be configured to monitor line currents 372-1, 372-2, and 372-3. Line currents 372-1, 372-2, and 372-3 may correspond to one phase of a three-phase signal used to drive a propulsion mechanism (e.g., a motor) of a UAV. According to an exemplary implementation, line currents 372-1, 372-2, and 372-3 may be monitored on the low-side of a three-phase inverter (e.g., at shunt resistors 212, 214, and 216) of a power stage of a motor control and/or drive system configured to drive and control the propulsion mechanism (e.g., a motor) of the UAV.

An absolute value and a maximum value of each line current 372-1, 372-2, and 372-3 may be obtained (e.g., in block 374) to obtain the peaks of each of line currents 372-1, 372-2, and 372-3. The maximum values associated with line currents 372-1, 372-2, and 372-3 may be filtered by low-pass filter 376. The filtered signal may be compared against one or more current thresholds (e.g., block 378). For example, the filtered signal can be compared to a low current threshold, a middle current threshold, and a high current threshold. If the filtered signal exceeds any of the current thresholds, overcurrent fault condition 380 may be triggered. The overcurrent fault triggered by the low-threshold overcurrent protection mechanism may initiate a protection protocol where a warning may be broadcast to other systems and controllers of the UAV alerting the systems and controllers of the fault condition.

Figure 3G:
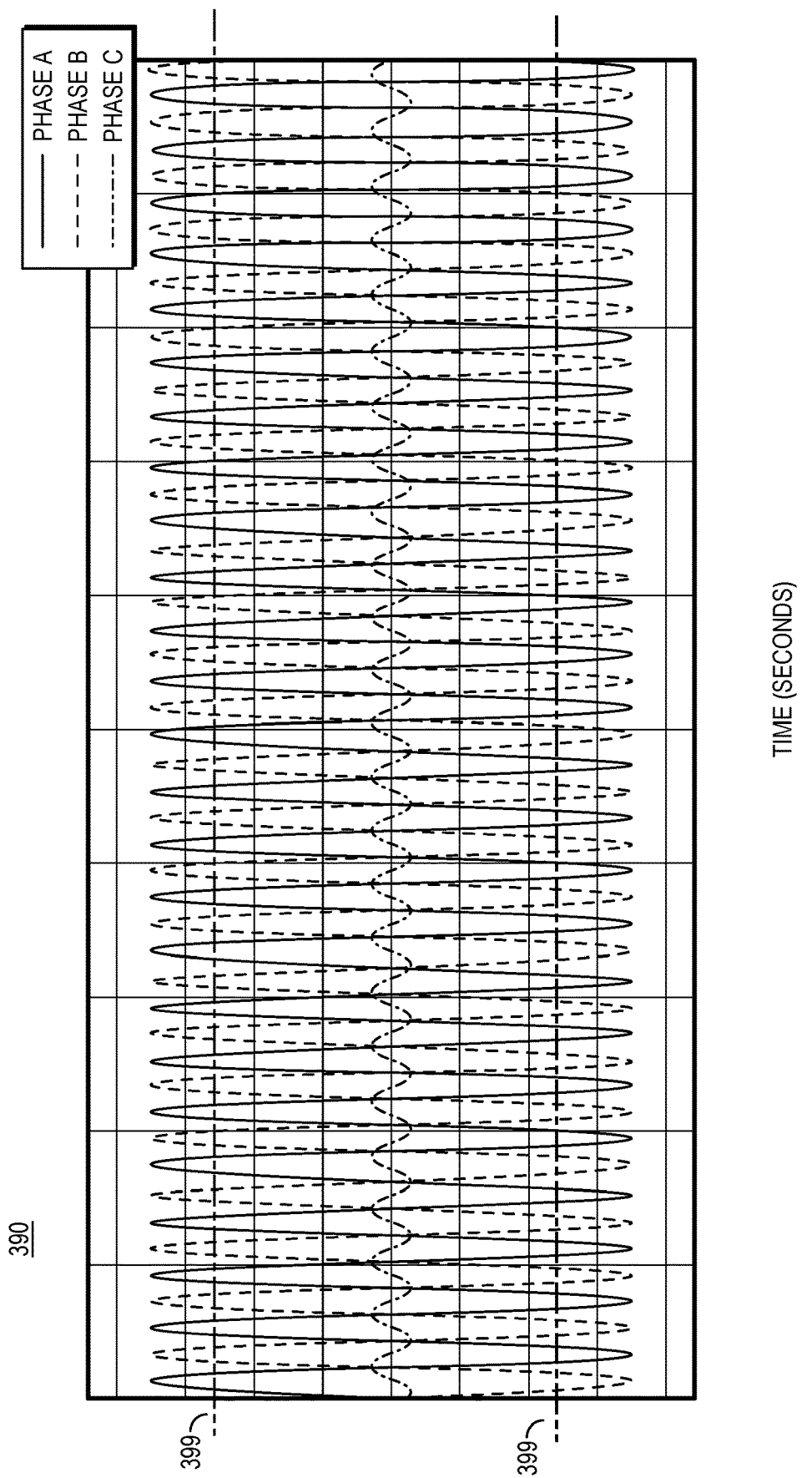
FIGS. 3G-3I are illustrations of exemplary waveforms associated with the performance of overcurrent protection mechanisms, according to exemplary embodiments of the present disclosure.
Figure 3H:
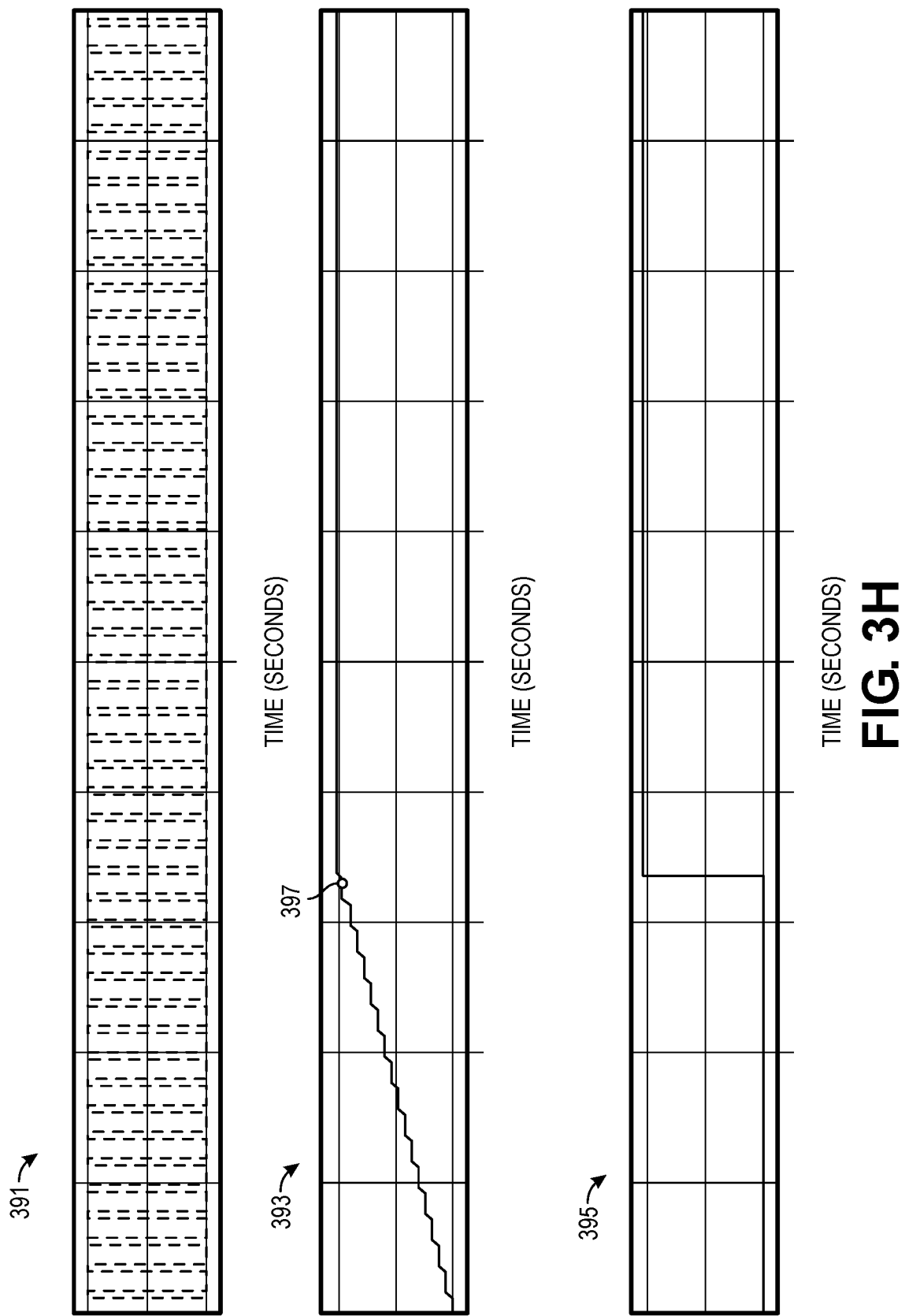
Figure 3I:
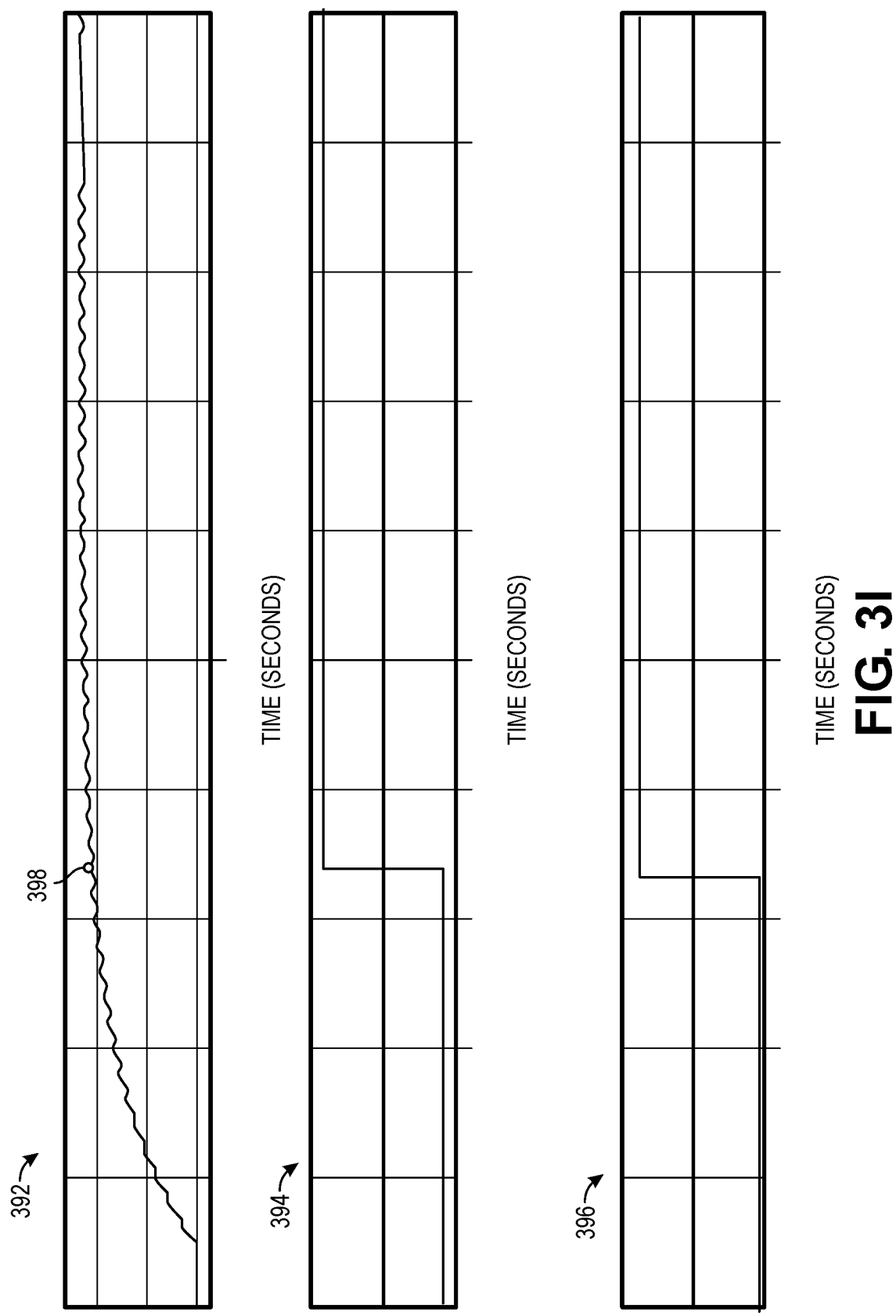

FIGS. 3G-3I are illustrations of exemplary waveforms associated with the performance of overcurrent protection mechanisms, according to exemplary embodiments of the present disclosure.

FIG. 3G illustrates exemplary waveform 390, which is an illustrative plot of the line currents (e.g., line currents 302-1, 302-2, and/or 302-3) as a function of time. Each line current (e.g., described as Phase A, Phase B, and Phase C in FIG. 3G) may correspond to a phase of a three-phase signal used to drive a propulsion mechanism (e.g., a motor) of a UAV. As shown in FIG. 3G, a maximum value of the absolute value of phase A and phase B may exceed a current threshold value (dashed lines 399) while the maximum value of the absolute value of phase C remains below the current threshold value.

FIG. 3H illustrates exemplary waveforms 391, 393, and 395 associated with the performance of an overcurrent protection mechanism, such as high-threshold overcurrent protection mechanism 350 in view of the line currents plotted in FIG. 3G. As shown in waveform 391 of FIG. 3H, as the line current shown in waveform 390 exceeds the current threshold value, a comparator output (e.g., at block 356) may include a logic HIGH. Accordingly, a counter/accumulator (e.g., accumulator 358) may be incremented in response to the logic HIGH generated by the comparator as a result of the current exceeding the current threshold, as shown in waveform 393. Once the counter/accumulator reaches a counter/accumulator threshold (e.g., at point 397), an overcurrent fault condition may be triggered, as shown by the logic high in waveform 395.

FIG. 3I illustrates exemplary waveforms 392, 394, and 396 associated with the performance of an overcurrent protection mechanism, such as high-threshold overcurrent protection mechanism 370 in view of the line currents plotted in FIG. 3G. As shown in waveform 392 of FIG. 3I, a low-pass filter (e.g., low-pass filter 376) behaves an integrator circuit. Accordingly, when the filtered output exceeds a threshold value (e.g., at point 398), a comparator output (e.g., block 378) may generate a logic HIGH. Accordingly, the logic HIGH generated by the comparator may trigger an overcurrent fault condition, as shown by the logic high in waveform 396.

FIGS. 4A-4D are block diagrams of exemplary ground fault protection mechanisms 400, 420, 440, and 460, according to exemplary embodiments of the present disclosure.

According to exemplary embodiments of the present disclosure, ground fault protection mechanisms 400, 420, and 440 may be implemented primarily as a hardware solution (e.g., as an integrated circuit, as a discrete circuit, etc.) to monitor and detect ground fault conditions. For example, a ground fault condition may arise when a line may short circuit to ground. As illustrated, ground fault protection mechanism 400 may monitor currents at the positive and negative terminals (e.g., DC positive current 402-1 and DC negative current 402-2) of the DC portion/components of a motor control and/or drive system for a propulsion mechanism of a UAV. In the example implementation illustrated in FIG. 2, DC positive current 402-1 and DC negative current 402-2 may be monitored at shunt resistors 222 and 224.

Under normal operating conditions, the current flowing through the positive and negative terminals (e.g., DC positive current 402-1 and DC negative current 402-2) should be substantially equal. Accordingly, under normal operating conditions, the sum of DC positive current 402-1 and DC negative current 402-2 is close to zero. However, in ground fault conditions, the ground fault may present a leakage current path such that DC positive current 402-1 and DC negative current 402-2 are no longer substantially equal, and therefore the sum of DC positive current 402-1 and DC negative current 401-2 would be non-zero, representing the occurrence of a ground fault condition.

Figure 4A:
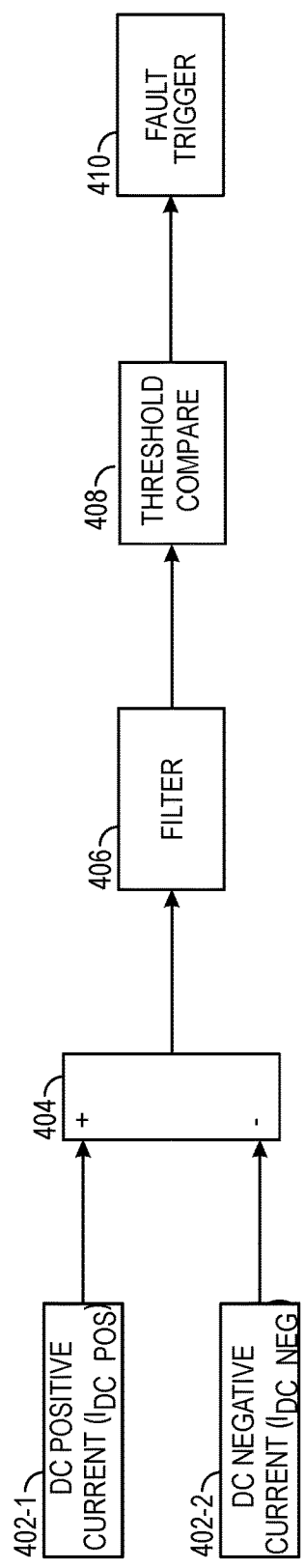
FIGS. 4A-4D are block diagrams of exemplary ground fault protection mechanisms, according to exemplary embodiments of the present disclosure.

As illustrated in FIG. 4A, ground fault protection mechanism 400 obtains DC positive current 402-1 and DC negative current 402-2 as inputs, which are then summed by adder circuit 404 (e.g., an adder amplifier using an operational amplifier, resistive adder circuit, etc.), and filtered using low-pass filter 406. A comparison of the output of low-pass filter 406 may be performed against a threshold value in block 408 (e.g., using a comparator, operational amplifier, etc.). If the filtered sum of DC positive current 402-1 and DC negative current 402-2 exceeds the threshold value, ground fault condition 410 may be triggered. The triggering of ground fault condition 410 may cause ground fault protection mechanism 400 to initiate a protection protocol where the control signal is immediately terminated and at least a portion of the motor control and/or drive system is isolated. Additionally, a warning may be broadcast to other systems and controllers of the UAV, alerting the systems and controllers of the fault condition.

Figure 4B:
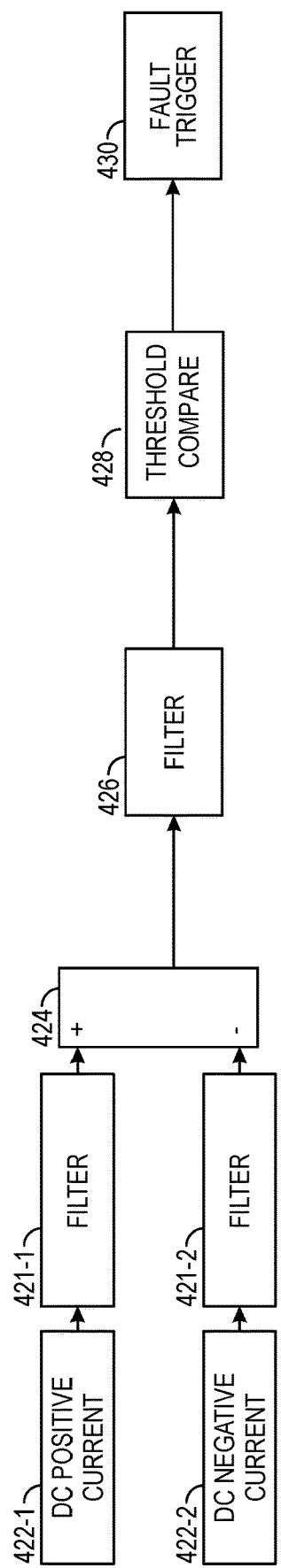
Figure 4C:
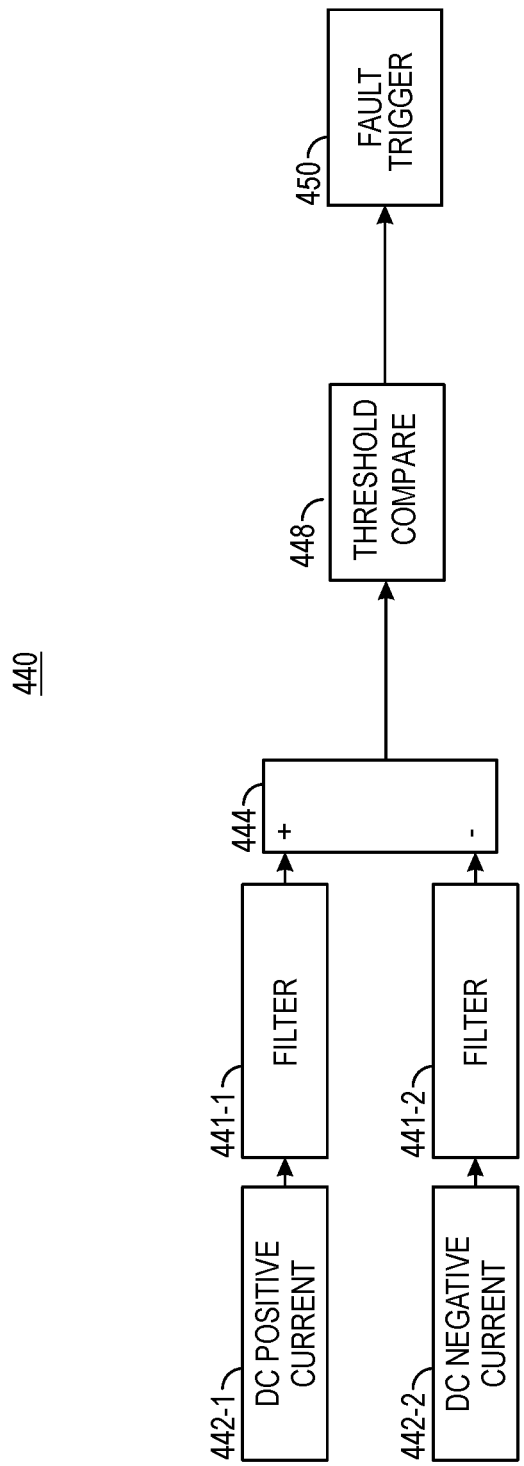

According to aspects of the present disclosure, certain parameters associated with ground fault protection mechanism 400 may be modified in view of the specific application of ground fault protection mechanism 400. For example, the threshold value, a cutoff frequency associated with low-pass filter 406, a filter type associated with low-pass filter 406, and a number and location(s) of low-pass filter 406 may be modified in view of the specific application of ground fault protection mechanism 400. These parameters may be modified in view of the specifications of the particular application and a desired detection time versus noise ratio. According to one example implementation, the threshold may be established at approximately 20 A, and filter 406 may include a first order filter with a 400 Hz cutoff frequency. Aspects of the present disclosure contemplate other types of filters (e.g., second order low-pass filter, third order low-pass filter, higher order low-pass filter, a Butterworth filter, and the like), with various cutoff frequencies (e.g., 300 Hz, 500 Hz, 1 kHz, 5 kHz, 10 kHz, etc.), disposed at different locations. FIGS. 4B and 4C illustrate ground fault protection mechanisms 420 and 440 having filters disposed at different locations. As shown in FIG. 4B, ground fault protection mechanism 420 is substantially similar to ground fault protection mechanism 400 illustrated in FIG. 4A but includes low-pass filters 421-1 and 421-2, which filters DC positive current 422-1 and DC negative current 422-2 prior to being summed by adder circuit 424, in addition to low-pass filter 426, which filters the output of adder circuit 424. FIG. 4C illustrates yet another exemplary implementation, where ground fault protection mechanism 440 includes low-pass filters 441-1 and 441-2, which filters DC positive current 442-1 and DC negative current 442-2 prior to being summed by adder circuit 444 but does not include a filter at the output of adder circuit 444.

Figure 4D:
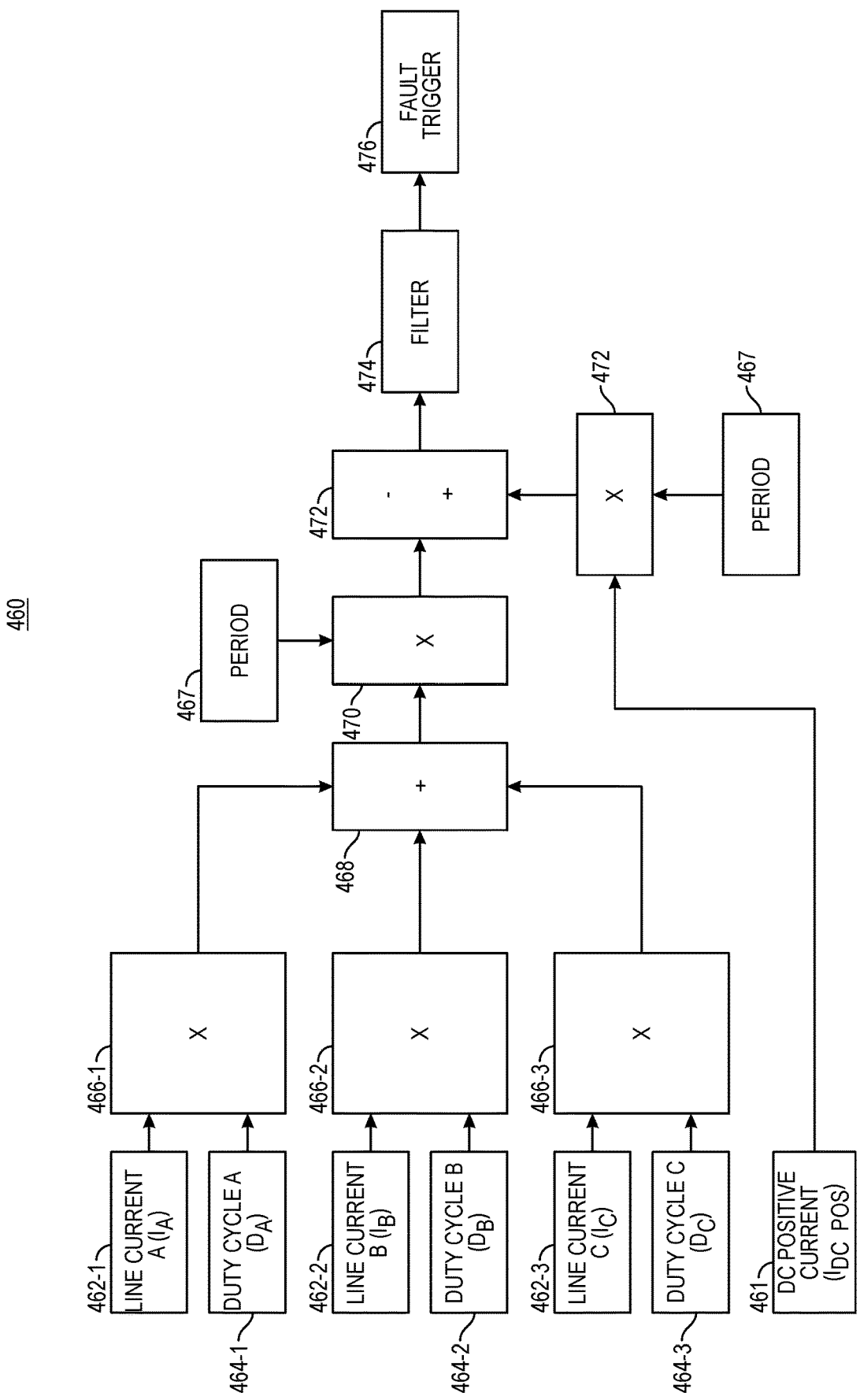

FIG. 4D is a block diagram of exemplary ground fault protection mechanism 460, according to exemplary embodiments of the present disclosure. Compared to ground fault protection mechanisms 400, 420, and 440 shown in FIGS. 4A-4C, ground fault protection mechanism 460 compares the current at the positive terminal (e.g., DC positive current 461) of the DC portion/components of a motor control and/or drive system for a propulsion mechanism of a UAV with the line currents associated with the AC portion/components of the motor control and/or drive system for the propulsion mechanism of the UAV rather than the current at the negative terminal of the DC portion/components.

As illustrated, ground fault protection mechanism 460 may monitor currents at the DC positive terminal (e.g., DC positive current 461) of the DC portion/components of a motor control and/or drive system for a propulsion mechanism of a UAV and the line currents (e.g., line current A 462-1, line current B 462-2, and line current C 462-3) associated with the AC portion/components of the motor control and/or drive system. Line current A 462-1, line current B 462-2, and line current C 462-3 may each correspond to one phase of a three-phase signal used to drive the propulsion mechanism of the UAV and may be monitored on the low-side of a three-phase inverter of a power stage of the motor control and/or drive system. In the example implementation illustrated in FIG. 2, DC positive current 461 may be monitored at shunt resistor 222, and line currents 462 may be monitored at shunt resistors 212, 214, and 216.

Under normal operating conditions, the charge flowing through the positive terminal (e.g., DC positive current 461) and the line currents associated with the AC portion/components (e.g., line current A 462-1, line current B 462-2, and line current C 462-3) should be substantially equal. Accordingly, this can be represented as:

$$Q_{A,B,C} = Q_{POS\_DC}$$

where $Q_{A, B, C}$ may represent the total charge (in coulombs) of the line currents and $Q_{POS\_DC}$ may represent the total charge (in coulombs) of the DC positive terminal current. Since $Q = I*t$, the above equation can be represented as:

$$(I_A*D_A + I_B*D_B + I_C*D_C)*T_{Period} = I_{POS\_DC}*T_{Period}$$

which can also be written as:

$$(I_A*D_A + I_B*D_B + I_C*D_C) = I_{POS\_DC}$$

where $I_A$ may represent line current A, $D_A$ may represent the duty cycle of line current A, $I_B$ may represent line current B, $D_B$ may represent the duty cycle of line current B, $I_C$ may represent line current C, $D_C$ may represent the duty cycle of line current C, $I_{POS\_DC}$ may represent the DC positive terminal current, and $T_{Period}$ may represent the switching period. Based on the above, a ground fault may be detected on the basis of:

$$\text{ground fault} = I_{POS\_DC}*T_{Period} - (I_A*D_A + I_B*D_B + I_C*D_C)*T_{Period}$$

As illustrated in FIG. 4D, each of line current A 462-1, line current B 462-2, and line current C 462-3 are multiplied by duty cycle A 464-1, duty cycle B 464-2, and duty cycle C 464-3, respectively, by multipliers 466-1, 466-2, and 466-3. The output of multipliers 466-1, 466-2, and 466-3 is summed by adder 468, which is multiplied by switching period 467 by multiplier 470. The output of multiplier 470 is summed with the product of DC positive current 461 and switching period 467 by adder 472. The output of adder 472 is filtered by low-pass filter 474 and if the filtered sum of time-scaled line current A 462-1, line current B 462-2, line current C 462-3, and DC positive current 461 exceeds a threshold value, a ground fault condition 476 may be triggered. The triggering of ground fault condition 476 may cause ground fault protection mechanism 460 to initiate a protection protocol where the control signal is immediately terminated and at least a portion of the motor control and/or drive system is isolated. Additionally, a warning may be broadcast to other systems and controllers of the UAV, alerting the systems and controllers of the fault condition.

Figure 5:
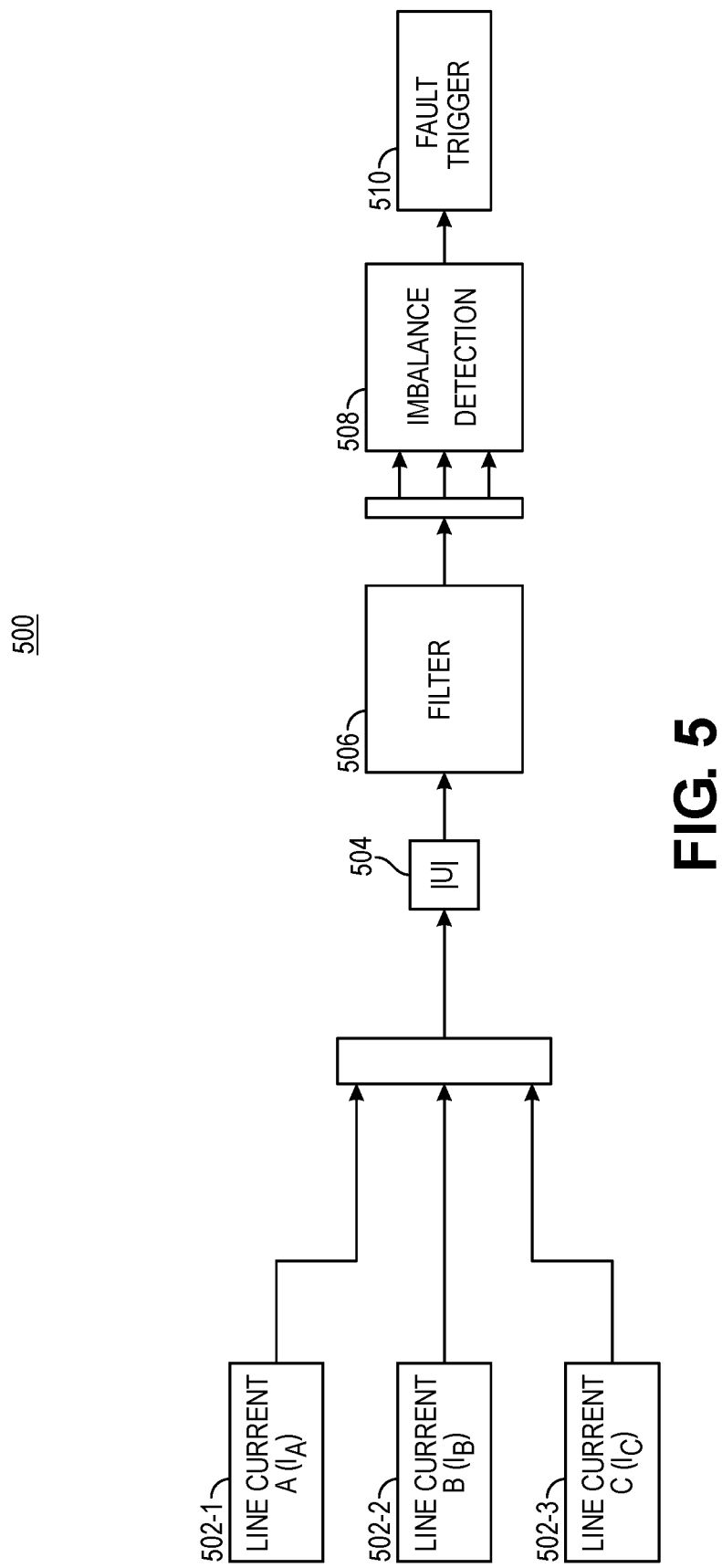
FIG. 5 is a block diagram of an exemplary current imbalance protection mechanism, according to exemplary embodiments of the present disclosure.

FIG. 5 is a block diagram of an exemplary current imbalance protection mechanism 500, according to exemplary embodiments of the present disclosure.

According to exemplary embodiments of the present disclosure, current imbalance protection mechanism 500 may be configured to monitor and detect current imbalances experienced in the line currents associated with the AC portion/components of a motor control and/or drive system for a propulsion mechanism of a UAV. The line currents may correspond to the phases of a three-phase signal used to drive the propulsion mechanism (e.g., a motor) of the UAV and under normal operating conditions, the line currents are typically substantially equal. However, current imbalances in the line currents may be experienced as a result of anomalies and/or fault conditions, such as an open circuit (e.g., in cabling, connectors, leads, switch faults, etc.). Accordingly, such open circuit conditions can result in an anomaly where the line currents are no longer equal.

As illustrated in FIG. 5, current imbalance protection mechanism 500 may be configured to monitor line current A 502-1, line current B 502-2, and line current C 502-3 to detect an imbalance in line current A 502-1, line current B 502-2, and line current C 502-3. According to certain exemplary implementations, line current A 502-1, line current B 502-2, and line current C 502-3 may be monitored on the low-side of a three-phase inverter of a power stage of the motor control and/or drive system (e.g., at shunt resistors 212, 214, and 216). However, according to aspects of the present disclosure, the line currents may be monitored at different locations. An absolute value for each of line current A 502-1, line current B 502-2, and line current C 502-3 is determined by absolute value calculator 504, which is then filtered by filter 506. According to exemplary implementations, filter 506 can include a second order, low-pass filter, variable frequency filter, and the like. Accordingly, filter 506 can generate a DC current value for each of line current A 502-1, line current B 502-2, and line current C 502-3. The DC current value determined for each of line current A 502-1, line current B 502-2, and line current C 502-3 may be comparable to and/or approximate a root-mean-square (RMS) value associated with each of line current A 502-1, line current B 502-2, and line current C 502-3. According to certain aspects of the present disclosure, rather than the DC current value generated by filter 506, an RMS value associated with each line current A 502-1, line current B 502-2, and line current C 502-3 may be used.

The determined DC current values for line current A 502-1, line current B 502-2, and line current C 502-3 can be provided to imbalance detection 508 which can determine, based on the DC values, whether a current imbalance exists between line current A 502-1, line current B 502-2, and line current C 502-3. For example, imbalance detection 508 can compare the three DC values to determine a maximum DC value and a minimum DC value from the three DC values. The maximum and minimum DC values can be compared (e.g., the minimum DC value can be divided by the maximum DC value, etc.) and the comparison can be compared against a threshold value to determine whether a current imbalance fault condition exists, and a line current imbalance fault condition 510 may be triggered. For example, in exemplary implementations where the minimum DC value is divided by the maximum DC value, a quotient substantially below one can indicate the presence of a fault condition that is resulting in an imbalance between the line currents. The triggering of current imbalance fault condition 510 may cause current imbalance fault condition protection mechanism 500 to initiate a protection protocol where a warning may be broadcast to other systems and controllers of the UAV, alerting the systems and controllers of the fault condition.

Advantageously, imbalance protection mechanism 500 requires no additional hardware. Further, filtering the line currents (e.g., line current A 502-1, line current B 502-2, and line current C 502-3) to obtain the DC current values is substantially more computationally efficient compared to calculating RMS values for the line currents.

Figure 6:
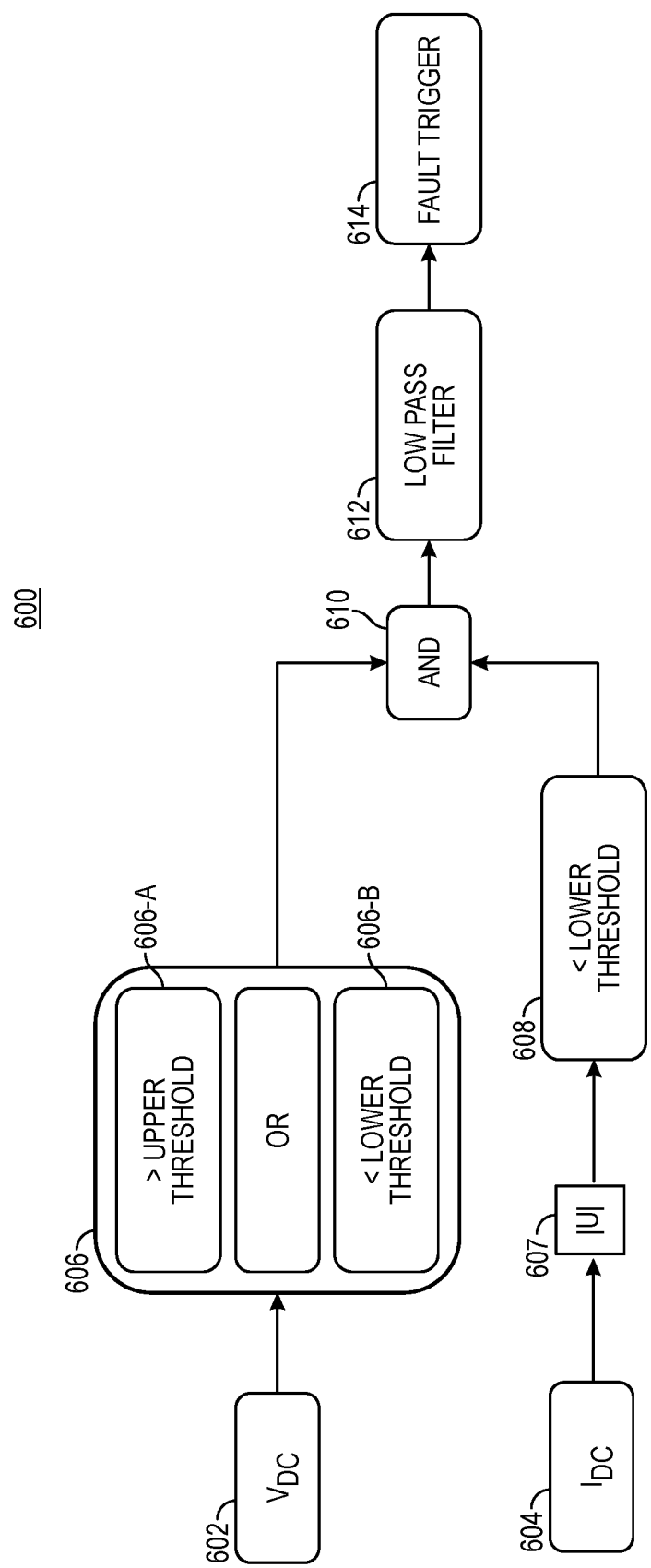
FIG. 6 is a block diagram of an exemplary DC open circuit protection mechanism, according to exemplary embodiments of the present disclosure.

FIG. 6 is a block diagram of an exemplary DC open circuit protection mechanism 600, according to exemplary embodiments of the present disclosure.

According to exemplary embodiments of the present disclosure, DC open circuit protection mechanism 600 may be configured to detect failure and/or fault conditions in connection with an open circuit type failure in connection with the DC portion/components of a motor control and/or drive system for a propulsion mechanism of a UAV. Such open circuit conditions can be caused by, for example, a fuse failure, a connector failure, a cable and/or trace failure, and the like. Further, although it may be expected that DC current would immediately drop in view of the open circuit condition, under certain conditions, the DC voltage may be maintained (e.g., continued spinning of the motor may cause a reverse power flow that maintains DC voltage) despite the open circuit condition.

As illustrated in FIG. 6, DC open circuit protection mechanism 600 may be configured to monitor the DC bus voltage (e.g., $V_{DC}$ 602) and the DC current (e.g., $I_{DC}$ 604). The DC bus voltage and the DC current may be monitored using any available means, and the DC current may be measured at either the positive or negative terminal of the DC portion/components. DC bus voltage $V_{DC}$ 602 may be compared, in block 606, against an upper threshold 606-A and a lower threshold 606-B, while an absolute value (e.g., block 607) of DC current $I_{DC}$ 604 is compared against a current threshold, in block 608. The comparisons of DC bus voltage VDC 602 with the upper and lower thresholds and the comparison of DC current $I_{DC}$ 604 with the current threshold is provided to AND logic 610. For example, block 606 will return a logic high/true if DC bus voltage $V_{DC}$ 602 is either above upper threshold 606-A or below lower threshold 606-B. Additionally, block 608 will return a logic high/true if DC current IDC 604 is below the current threshold. Accordingly, open circuit protection mechanism 600 will only trigger a fault when both: (1) DC current IDC 604 is below the current threshold; and (2) DC bus voltage VDC 602 is either above upper threshold 606-A or below lower threshold 606-B. As shown in FIG. 6, the output of AND logic 610 is provided to low-pass filter 612, and DC open circuit fault condition 614 may be triggered when both DC current IDC 604 and DC bus voltage Vic 602 conditions in blocks 608 and 606, respectively, are satisfied. The triggering of DC open circuit fault condition 614 may cause DC open circuit fault protection mechanism 600 to initiate a protection protocol where a warning may be broadcast to other systems and controllers of the UAV, alerting the systems and controllers of the fault condition.

FIGS. 7A and 7B are block diagrams of exemplary DC overcurrent protection mechanisms 700 and 720, according to exemplary embodiments of the present disclosure.

According to exemplary embodiments of the present disclosure, DC overcurrent protection mechanisms 700 and 720 may be configured to detect DC overcurrent fault conditions in connection with the DC portion/components of a motor control and/or drive system for a propulsion mechanism of a UAV. For example, an undetected overcurrent condition in connection with the AC portion/components may propagate to the DC portion/components and cause DC current overshoots in connection with the DC portion/components. Accordingly, DC overcurrent protection mechanisms 700 and 720 may detect such DC current overshoots.

As illustrated in FIG. 7A, DC overcurrent protection mechanism 700 may be configured to monitor the DC current (e.g., IDC 702). The DC current may be measured at the negative terminal of the DC portion/components. As shown in FIG. 7A, DC current IDC 702 may be compared to one or more current threshold values at block 704. According to exemplary implementations of the present disclosure, the threshold values can be a continuous value that may be generated (e.g., using a polynomial equation, an exponential equation, a logarithmic equation, etc.) or a stepwise function that specifies multiple threshold values. Based on whether any of the current thresholds is exceeded, a counter is initiated in block 706. A count threshold for the counter may be inversely proportional to the current threshold value that has been exceeded by DC current IDC 702. For example, if DC current IDC 702 exceeds a relatively high current threshold (e.g., 250 A, etc.) a relatively low count threshold may be required to trigger DC overcurrent fault condition 708. Conversely, if DC current IDC 702 exceeds a relatively lower current threshold (e.g., 150 A, etc.), a relatively higher count threshold may be required to trigger DC overcurrent fault condition 708. This may correlate to the amount of time that the system can sustain or tolerate a certain magnitude of current for a period of time. For example, the system may be able to sustain a relatively lower current for a relatively longer period of time, while being able to sustain a relatively higher current for a relatively shorter period of time. According to exemplary implementations, the current thresholds and the count threshold may be adjusted depending on the particular application of DC overcurrent protection mechanism 700. Accordingly, if the counter 706 reaches the specified count threshold, DC overcurrent fault condition 708 may be triggered. The triggering of DC overcurrent fault condition 708 may cause DC overcurrent protection mechanism 700 to initiate a protection protocol where a warning may be broadcast to other systems and controllers of the UAV, alerting the systems and controllers of the fault condition.

FIG. 7B illustrates another exemplary implementation of a DC overcurrent protection mechanism, according to exemplary embodiments of the present disclosure. As illustrated in FIG. 7B, DC overcurrent protection mechanism 720 may be configured to monitor the DC current (e.g., IDC 722). The DC current may be measured at the negative terminal of the DC portion/components. As shown in FIG. 7B, DC current IDC 722 may be filtered by filter 724. For example, filter 724 may include any type of low pass filter as described herein. The filtered signal may be compared to one or more current threshold values at block 726. According to exemplary implementations of the present disclosure, the current threshold values can be a continuous value that may be generated (e.g., using a polynomial equation, an exponential equation, a logarithmic equation, etc.) or a stepwise function that specifies multiple current threshold values. Based on whether any of the current thresholds is exceeded, DC overcurrent fault condition 728 may be triggered. The delay introduced by filter 724 may be inversely proportional to the value of DC current IDC 722. For example, if DC current IDC 722 is at a relatively high value (e.g., 250 A, etc.) a relatively short delay may be introduced by filter 724. Conversely, if DC current IDC 722 is at a relatively lower value (e.g., 150 A, etc.) a relatively longer delay may be introduced by filter 724. This may correlate to the amount of time that the system can sustain or tolerate a certain magnitude of current for a period of time. For example, the system may be able to sustain a relatively lower current for a relatively longer period of time, while being able to sustain a relatively higher current for a relatively shorter period of time. According to exemplary implementations, the current thresholds and the delay introduced by filter 724 may be adjusted depending on the particular application of DC overcurrent protection mechanism 720. Accordingly, if any of the current thresholds is exceeded by the filtered signal, DC overcurrent fault condition 728 may be triggered. The triggering of DC overcurrent fault condition 728 may cause DC overcurrent protection mechanism 720 to initiate a protection protocol where a warning may be broadcast to other systems and controllers of the UAV, alerting the systems and controllers of the fault condition.

Figure 7C:
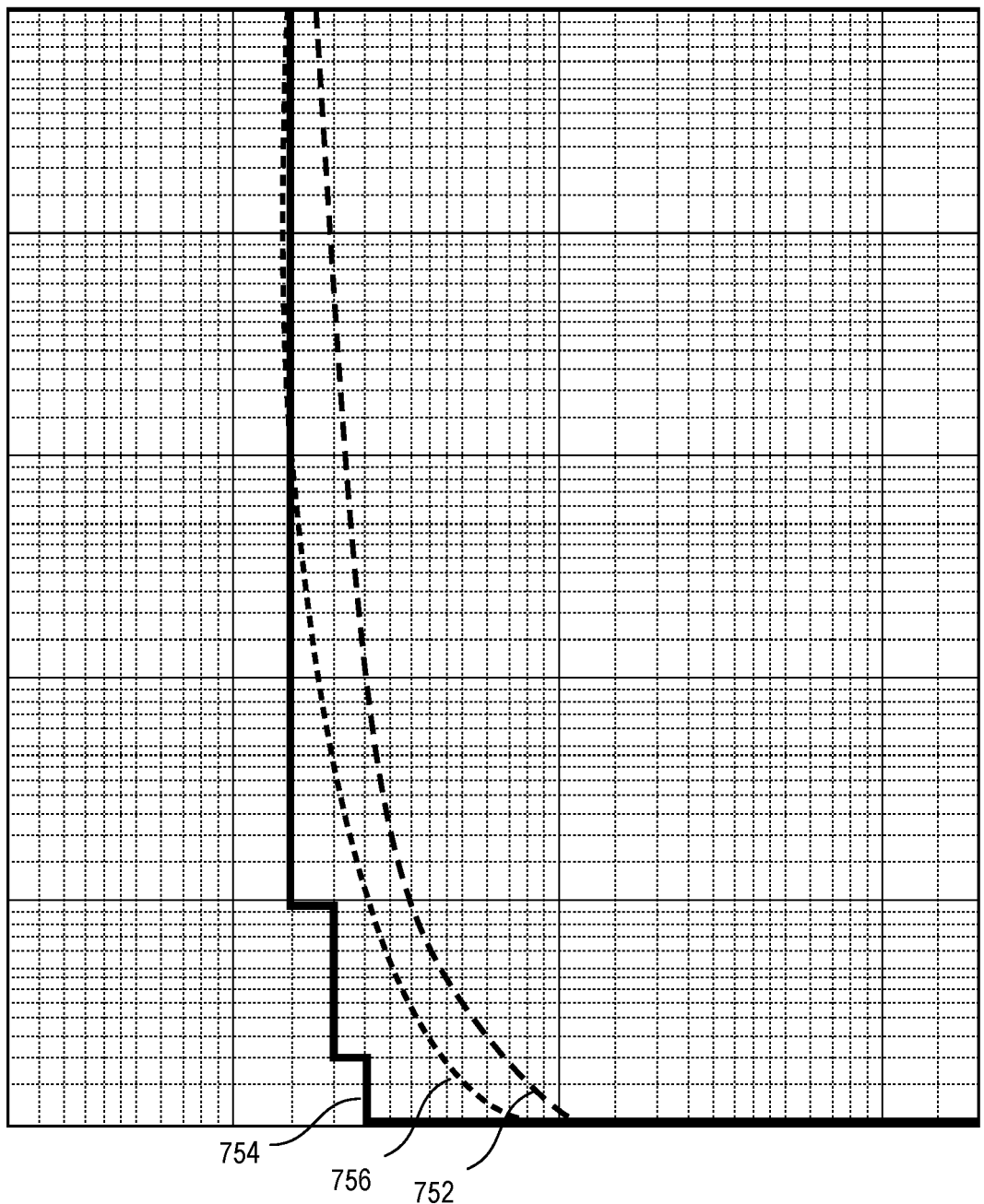
FIG. 7C is an illustration of an exemplary graph associated with the performance of a DC overcurrent protection mechanism, according to exemplary embodiments of the present disclosure.

FIG. 7C is an illustration of an exemplary graph associated with the performance of a DC overcurrent protection mechanism, according to exemplary embodiments of the present disclosure.

FIG. 7C illustrates exemplary graph 750, which is an illustration of an exemplary fuse curve 752 plotting time as a function of current. Specifically, the plot defines the amount of time it takes for a fuse to fail (e.g., blow) as a function of the current. Accordingly, a higher current will cause a fuse to blow in a shorter period of time than at a lower current. Graph 750 also illustrates the current threshold values that may be established in connection with a DC overcurrent protection mechanism, such as DC overcurrent protection mechanisms 700 and 720. As shown in FIG. 7C, threshold 754 can represent a stepwise threshold function, whereas threshold 756 can represent a continuous threshold function. As illustrated, thresholds 754 and 756 replicate and follow behind fuse curve 752. Accordingly, crossing either threshold 754 or 756 may trigger a DC overcurrent fault before the current reaches fuse curve 752, thereby preventing the fuse from failure (e.g., blowing).

According to aspects of the present disclosure, the filters and the counter/accumulator circuits employed by the various protection mechanisms provided in accordance with exemplary embodiments of the present disclosure may be substantially interchangeable based on the particular application of each respective protection mechanism. For example, counter/accumulator circuits may be employed for applications where timing, traceability, and the like may be important. Conversely, filter-based implementations may be preferable in applications where faster fault detection and triggering may be important. Accordingly, in connection with the described implementations (and as illustrated in connection with certain implementations), delay/accumulator 306 of high-threshold overcurrent protection mechanism 300, accumulator 358 of low-threshold overcurrent protection mechanism 350, and/or counter 706 of DC overcurrent protection mechanism 700 may be replaced with an appropriate filter (e.g., low pass filter, etc.). Similarly, filter 376 of low-threshold overcurrent protection mechanism 370, filters 406, 421, 426, 441, 474 of ground fault protection mechanisms 400, 420, 440, and 460, filter 506 of current imbalance protection mechanism 500, filter 612 of DC open circuit protection mechanism 600, and filter 724 of DC overcurrent protection mechanism 720 may be replaced with an appropriate counter/accumulator/delay circuit.

Figure 8:
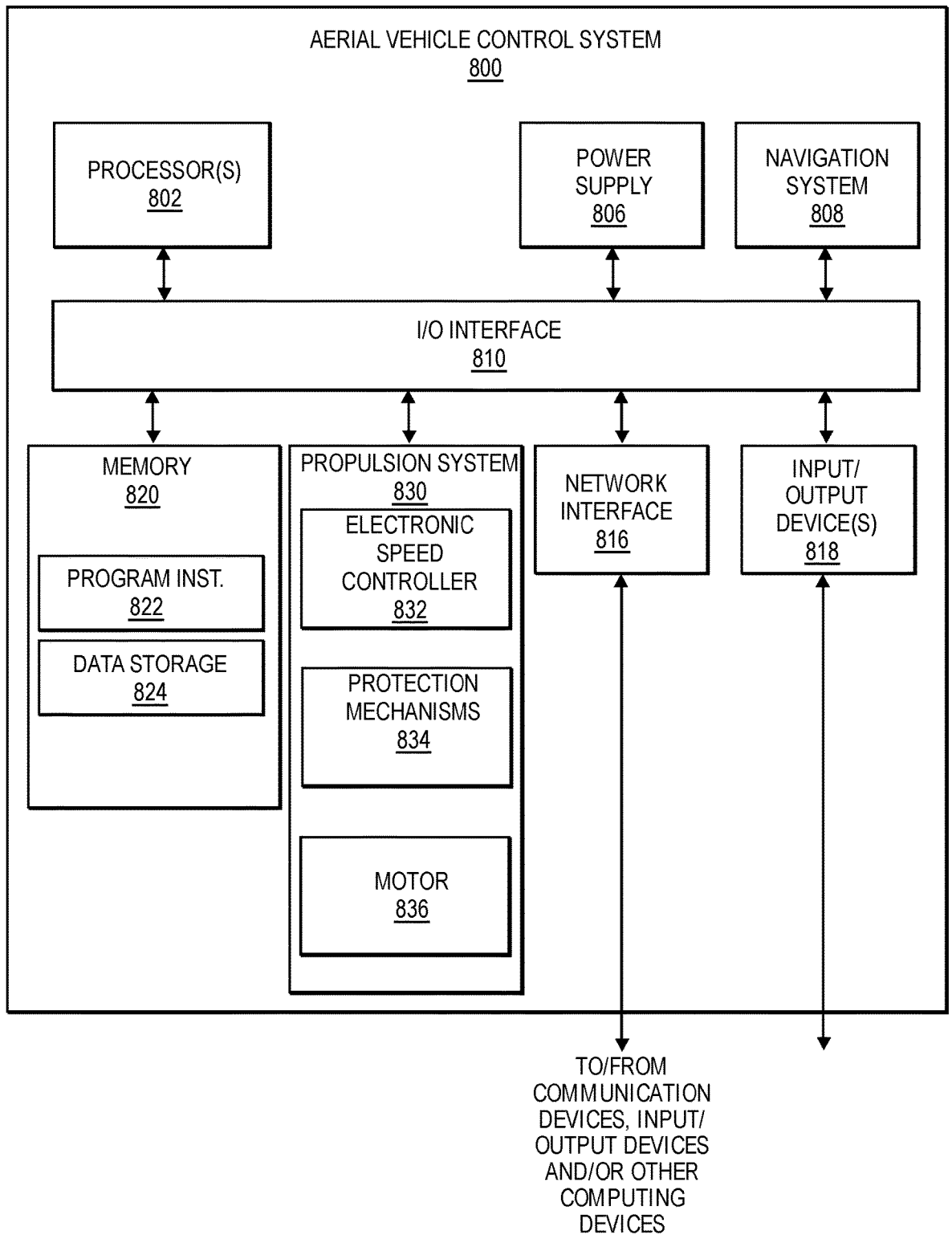
FIG. 8 is a block diagram illustrating various components of an exemplary aerial vehicle control system, according to exemplary embodiments of the present disclosure.

FIG. 8 is a block diagram illustrating various components of an exemplary aerial vehicle control system 800, according to exemplary embodiments of the present disclosure.

In various examples, the block diagram may be illustrative of one or more aspects of the aerial vehicle control system 800 that may be used to implement the various systems and processes discussed above. In the illustrated implementation, the aerial vehicle control system 800 includes one or more processors 802, coupled to a non-transitory computer readable storage medium 820 via an input/output (I/O) interface 810. The aerial vehicle control system 800 may also include a power supply or battery 806, and/or a navigation system 808. The aerial vehicle control system 800 may further include propulsion system 830, a network interface 816, and one or more input/output devices 818.

In various implementations, the aerial vehicle control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, and sensor calibration data and/or characteristics, including environment properties data, sensor environment properties data, light properties data, particle properties data, nominal spectral characteristics of imaging sensors, current spectral characteristics of imaging sensors, differences between nominal and current spectral characteristics of imaging sensors, calibrations of spectral characteristics of imaging sensors, correlations or mappings between various of the data, and/or other data items accessible by the processor(s) 802. In various implementations, the non-transitory computer readable storage medium 820 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, and data storage 824, respectively. In other implementations, program instructions and/or stored data may be received, sent or stored upon different types of computer-accessible media, such as non-transitory media, or on similar media separate from the non-transitory computer readable storage medium 820 or the aerial vehicle control system 800.

Generally, a non-transitory, computer readable storage medium may include storage media or memory media such as magnetic or optical media, e.g., disk or CD/DVD-ROM, coupled to the aerial vehicle control system 800 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The electronic speed controller 832 communicates with the navigation system 808 and adjusts the operational characteristics of each propulsion mechanism to guide the aerial vehicle along a determined path and/or to perform other navigational maneuvers. The navigation system 808 may include a GPS, IMU, altimeter, speed sensors, or other similar system than can be used to navigate the aerial vehicle to and/or from a location.

The aerial vehicle control system 800 may also include propulsion system 830 that drives and controls motor 836, and also communicates with the processor(s) 802, the non-transitory computer readable storage medium 820, power supply 806, and/or other components or systems described herein to provide a motor drive and/or control, as well as provide a tiered protection mechanism (e.g., protection mechanisms 834) for such systems, as described herein.

The network interface 816 may be configured to allow data to be exchanged between the aerial vehicle control system 800, other devices attached to a network, such as other computer systems, imaging sensors, and/or control systems of other vehicles, systems, machines, equipment, apparatuses, systems, or devices. For example, the network interface 816 may enable wireless communication between numerous aerial vehicles. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, imaging sensors, image capture devices, thermal sensors, infrared sensors, time of flight sensors, accelerometers, pressure sensors, weather sensors, various other sensors described herein, etc. Multiple input/output devices 818 may be present and controlled by the aerial vehicle control system 800. One or more of these sensors may be utilized to assist in performing the various functions, operations, and processes described herein.

As shown in FIG. 8, the memory may include program instructions 822, which may be configured to implement the example processes and/or sub-processes described above. The data storage 824 may include various data stores for maintaining data items that may be provided for performing the various functions, operations, and processes described herein. For example, the data storage 824 may contain trajectory/flight path/planning data, wind data, preferred orientation data, failure condition data, flight transition data, vulnerable orientation data, and/or other data items.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in FIGS. 3A, 3E, 3F, 4A-4D, 5, 6, 7A and 7B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle (UAV), comprising:
   a plurality of propulsion mechanisms; and
   a motor drive and control system associated with and configured to drive a respective one of the plurality of propulsion mechanisms, each motor drive and control system including:
   a direct current (DC) portion electrically coupled to an alternating current (AC) portion, wherein the AC portion generates a three-phase signal to drive the respective one of the plurality of propulsion mechanisms;
   an AC high-threshold overcurrent protection mechanism configured to monitor currents associated with each phase of the three-phase signal and trigger a high-threshold overcurrent fault condition based at least in part on the monitored currents associated with each phase of the three-phase signal;
   an AC low-threshold overcurrent protection mechanism configured to monitor the currents associated with each phase of the three-phase signal and trigger a low-threshold overcurrent fault condition based at least in part on the monitored currents associated with each phase of the three-phase signal;
   a first ground fault protection mechanism configured to monitor a DC positive current and a DC negative current and trigger a first ground fault condition based at least in part on the monitored DC positive current and the DC negative current;
   a second ground fault protection mechanism configured to monitor the DC positive current and the currents associated with each phase of the three-phase signal and trigger a second ground fault condition based at least in part on the monitored DC positive current and the currents associated with each phase of the three-phase signal;
   a current imbalance protection mechanism configured to monitor the currents associated with each phase of the three-phase signal and trigger a current imbalance fault condition based at least in part on the monitored currents associated with each phase of the three-phase signal;
   a DC open protection mechanism configured to monitor a DC bus voltage and at least one of the DC positive current or the DC negative current and trigger a DC open fault condition based at least in part on the monitored DC bus voltage and the at least one of the DC positive current or the DC negative current; and
   a DC overcurrent protection mechanism configured to monitor the DC positive current and trigger a DC overcurrent fault condition based at least in part on the monitored at least one of the DC positive current.

2. The UAV of claim 1, wherein:
   in response to the high-threshold overcurrent fault condition, the AC high-threshold overcurrent protection mechanism is further configured to at least initiate a first protection protocol terminating the three-phase signal and transmitting a first alert to other systems of the UAV;
   in response to the low-threshold overcurrent fault condition, the AC low-threshold overcurrent protection mechanism is further configured to at least initiate a second protection protocol transmitting a second alert to other systems of the UAV;
   in response to the first ground fault condition, the first ground fault protection mechanism is further configured to at least initiate a third protection protocol terminating the three-phase signal and transmitting a third alert to other systems of the UAV;
   in response to the second ground fault condition, the second ground fault protection mechanism is further configured to at least initiate a fourth protection protocol terminating the three-phase signal and transmitting a fourth alert to other systems of the UAV;
   in response to the current imbalance fault condition, the current imbalance protection mechanism is further configured to at least initiate a fifth protection protocol transmitting a fifth alert to other systems of the UAV;
   in response to the DC open fault condition, the DC open protection mechanism is further configured to at least initiate a sixth protection protocol transmitting a sixth alert to other systems of the UAV; and
   in response to the DC overcurrent fault condition, the DC overcurrent protection mechanism is further configured to at least initiate a seventh protection protocol transmitting a seventh alert to other systems of the UAV.

3. The UAV of claim 1, wherein the AC high-threshold overcurrent protection mechanism includes:

a comparator circuit that compares the currents associated with each phase of the three-phase signal against a current threshold and generates an output signal based at least in part on the comparison; and an accumulator circuit electrically coupled to an output of the comparator circuit that increments a counter based at least in part on the output signal generated by the comparator circuit, wherein the high-threshold overcurrent fault condition is triggered when the counter exceeds a counter threshold.

4. The UAV of claim 3, wherein the counter of the accumulator circuit is reset using at least one of:

a hard reset technique;

a decreasing integration technique; or an integration with time reset technique.

5. A protection mechanism for a motor drive and control system, comprising:

an alternating current (AC) high-threshold overcurrent protection mechanism configured to trigger a high-threshold overcurrent fault condition based at least in part on currents associated with each phase of a three-phase signal;

an AC low-threshold overcurrent protection mechanism configured to trigger a low-threshold overcurrent fault condition based at least in part on the currents associated with each phase of the three-phase signal; and a current imbalance protection mechanism configured to trigger a current imbalance fault condition based at least in part on the currents associated with each phase of the three-phase signal.

6. The protection mechanism of claim 5, wherein the AC high-threshold overcurrent protection mechanism is configured to, at least:

monitor the currents associated with each phase of the three-phase signal on a low-side of an inverter circuit;

determine that the currents associated with each phase of the three-phase signal exceeds a high-threshold overcurrent threshold for a period of time defined by an accumulator circuit; and trigger the high-threshold overcurrent fault condition based at least in part on the determination that the currents associated with each phase of the three-phase signal exceeds the high-threshold overcurrent threshold for the period of time.

7. The protection mechanism of claim 6, wherein the accumulator circuit is reset using at least one of:

a hard reset technique;

a decreasing integration technique; or an integration with time reset technique.

8. The protection mechanism of claim 5, wherein the AC low-threshold overcurrent protection mechanism is further configured to, at least one of:

determine that at least one of the currents associated with each phase of the three-phase signal exceeds a low-threshold overcurrent threshold for a period of time defined by an accumulator circuit and trigger the low-threshold overcurrent fault condition based on the determination that at least one of the currents associated with each phase of the three-phase signal exceeds the low-threshold overcurrent threshold for the period of time; or filter the currents associated with each phase of the three-phase signal, determine that a filtered value of at least one of the currents associated with each phase of the three-phase signal exceeds the low-threshold overcurrent threshold, and trigger the low-threshold overcurrent fault condition based on the determination that the filtered value of at least one of the currents associated with each phase of the three-phase signal exceeds the low-threshold overcurrent threshold.

9. The protection mechanism of claim 8, wherein:

the period of time is specified by an accumulator;

the low-threshold overcurrent threshold includes a plurality of low-threshold overcurrent thresholds; and each low-threshold overcurrent threshold of the plurality of low-threshold overcurrent thresholds is associated with a different count value for the accumulator.

10. The protection mechanism of claim 5, wherein the current imbalance protection mechanism is further configured to, at least:

filter each current associated with each phase of the three-phase signal to obtain a respective DC value for each respective current;

determine a maximum DC value from the respective DC values for each respective current;

determine a minimum DC value from the respective DC values for each respective current;

determine a quotient between the maximum DC value and the minimum DC value; and trigger the current imbalance fault condition based at least in part on the quotient.

11. The protection mechanism of claim 5, further comprising:

a first ground fault protection mechanism configured to trigger a first ground fault condition based at least in part on a direct current (DC) positive current and a DC negative current;

a second ground fault protection mechanism configured to trigger a second ground fault condition based at least in part on the DC positive current and the currents associated with each phase of the three-phase signal;

a DC open protection mechanism configured to trigger a DC open fault condition based at least in part on a DC bus voltage and at least one of the DC positive current or the DC negative current; and a DC overcurrent protection mechanism configured to trigger a DC overcurrent fault condition based at least in part on the DC positive current.

12. The protection mechanism of claim 11, wherein the DC overcurrent protection mechanism provides secondary coverage to at least one of the AC high-threshold protection mechanism or the AC low-threshold overcurrent protection mechanism.

13. A protection mechanism for a motor drive and control system, comprising:

a first ground fault protection mechanism configured to trigger a first ground fault condition based at least in part on a direct current (DC) positive current and a DC negative current;

a second ground fault protection mechanism configured to trigger a second ground fault condition based at least in part on the DC positive current and currents associated with each phase of a three-phase signal;

a DC open protection mechanism configured to trigger a DC open fault condition based at least in part on a DC bus voltage and at least one of the DC positive current or the DC negative current; and a DC overcurrent protection mechanism configured to trigger a DC overcurrent fault condition based at least in part on the DC positive current.

14. The protection mechanism of claim 13, wherein the first ground fault protection mechanism is further configured to, at least:

filter a sum of the DC positive current and the DC negative current to obtain a filtered output;

determine that the filtered output of the sum of the DC positive current and the DC negative current is not substantially zero; and trigger the first ground fault condition based at least in part on the determination that filtered value of the sum of the DC positive current and the DC negative current is not substantially zero.

15. The protection mechanism of claim 13, wherein the first ground fault protection mechanism is further configured to, at least:

filter the DC positive current to obtain a filtered DC positive current output;

filter the DC negative current to obtain a filtered DC negative current output;

sum the filtered DC positive current output and the filtered DC negative current output;

filter the sum of the filtered DC positive current output and the filtered DC negative current output to obtain a filtered output;

determine that the filtered output is not substantially zero; and trigger the first ground fault condition based at least in part on the determination that the filtered output is not substantially zero.

16. The protection mechanism of claim 13, wherein the second ground fault protection mechanism is further configured to, at least:

determine a first charge associated with the DC positive current;

determine a second charge associated with each current associated with each phase of the three-phase signal;

determine that the first charge associated with the DC positive current is not substantially equal to a sum of the second charges associated with the currents associated with each phase of the three-phase signal; and trigger the second ground fault condition based at least in part on the determination that the first charge associated with the DC positive current is not substantially equal to the sum of the second charges associated with the currents associated with each phase of the three-phase signal.

17. The protection mechanism of claim 16, wherein the second charge for each current is determined as a product of each respective current and a corresponding duty cycle.

18. The protection mechanism of claim 13, wherein the DC open protection mechanism is further configured to, at least:

determine that the DC bus voltage is either above an upper DC open voltage threshold or below a lower DC open voltage threshold;

determine that at least one of the DC positive current or the DC negative current is below a DC open current threshold; and trigger the DC open fault condition on the determination that:

at least one of the DC positive current or the DC negative current is below the DC open current threshold; and the DC bus voltage is either above the upper DC open voltage threshold or below the lower DC open voltage threshold.

19. The protection mechanism of claim 13, wherein the DC overcurrent protection mechanism is further configured to, at least one of:

determine that the DC positive current exceeds a DC overcurrent threshold for a period of time defined by an accumulator circuit and trigger the DC overcurrent fault condition based at least in part on the determination that the DC positive current exceeds the DC overcurrent threshold for the period of time; or filter the DC positive current, determine that the filtered DC positive current exceeds the DC overcurrent threshold, and trigger the DC overcurrent fault condition based at least in part on the determination that the filtered DC positive current exceeds the DC overcurrent threshold.

20. The protection mechanism of claim 19, wherein the DC overcurrent threshold is defined by at least one of a stepwise function or a continuous function.

* * * * *